United States Patent [19]
Fukushima

[11] Patent Number: 6,041,693
[45] Date of Patent: Mar. 28, 2000

[54] PAPER FILTER FEEDER FOR BEVERAGE EXTRACTOR

[75] Inventor: Naoto Fukushima, Gunma-ken, Japan

[73] Assignee: Sanyo Electric Co., Ltd., Osaka-Fu, Japan

[21] Appl. No.: 09/215,457

[22] Filed: Dec. 17, 1998

[51] Int. Cl.[7] ................................... A47J 31/32
[52] U.S. Cl. ..................... 99/289 T; 99/302 R
[58] Field of Search ............... 99/289 T, 302 R

[56] References Cited

U.S. PATENT DOCUMENTS

| | | | |
|---|---|---|---|
| 4,619,277 | 10/1986 | Okumoto et al. | 131/94 |
| 4,791,859 | 12/1988 | King | 99/289 T X |
| 4,998,462 | 3/1991 | Sekiguchi | 99/289 T |
| 5,299,491 | 4/1994 | Kawada | 99/289 T |

FOREIGN PATENT DOCUMENTS

| | | |
|---|---|---|
| 0 654 240 | 5/1995 | European Pat. Off. . |
| 1938163 | 7/1970 | Germany . |

OTHER PUBLICATIONS

Patent Abstracts of Japan, vol. 015, No. 338 (P–1243), Aug. 27, 1991.

*Primary Examiner*—Reginald L. Alexander
*Attorney, Agent, or Firm*—Sughrue, Mion, Zinn, Macpeak & Seas, PLLC

[57] ABSTRACT

The tension of a paper filter fed from a feed device is detected by a tension detection device. Based on the results of the detection, remainder detection device detects whether or not there is still paper filter remaining unused. Further, a guide device and drive device are provided. The guide device functions to guide a paper filter to be newly set to a nip between a delivery roller and a guide roller. The drive device, when the newly set paper filter has been guided to the nip between the delivery roller and the guide roller, functions to drive the delivery roller to nip the new paper filter between the delivery roller and the guide roller.

5 Claims, 23 Drawing Sheets

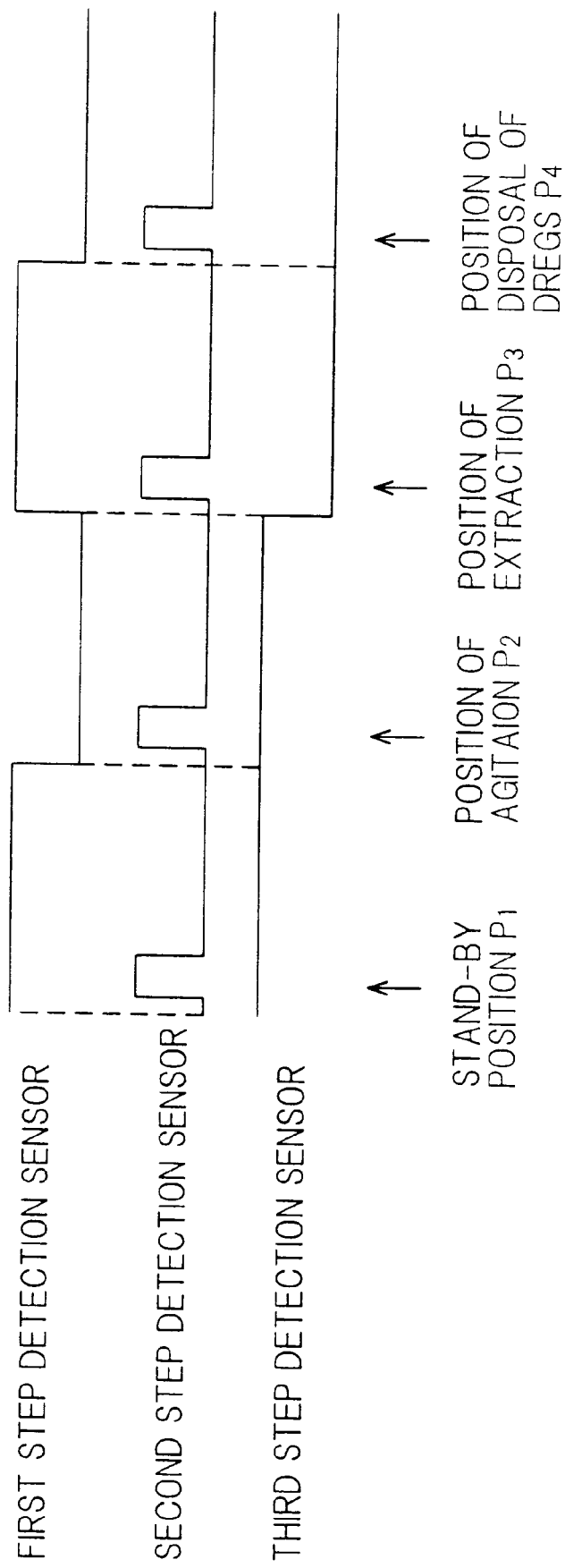

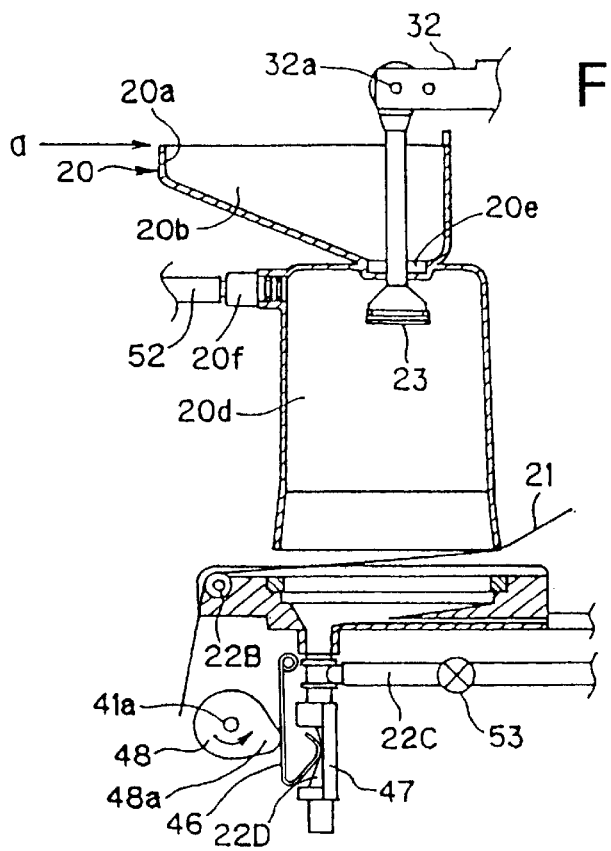
FIG.9A
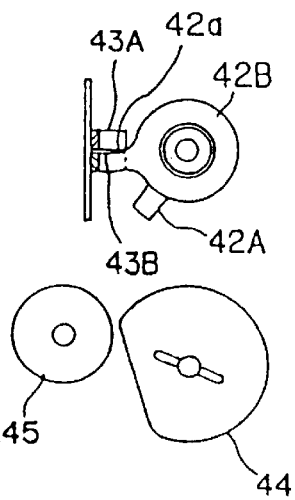
FIG.9B
FIG.9C
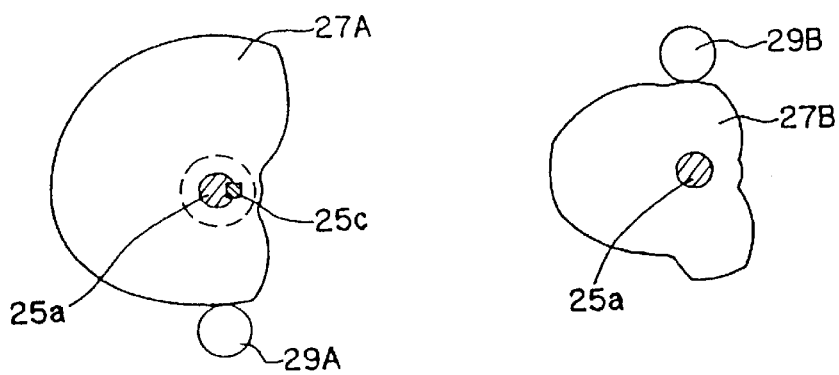
FIG.9D
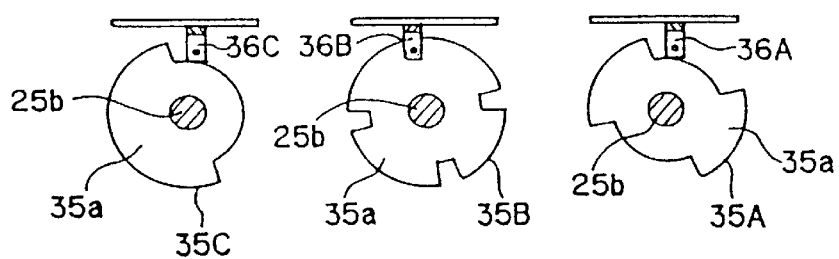

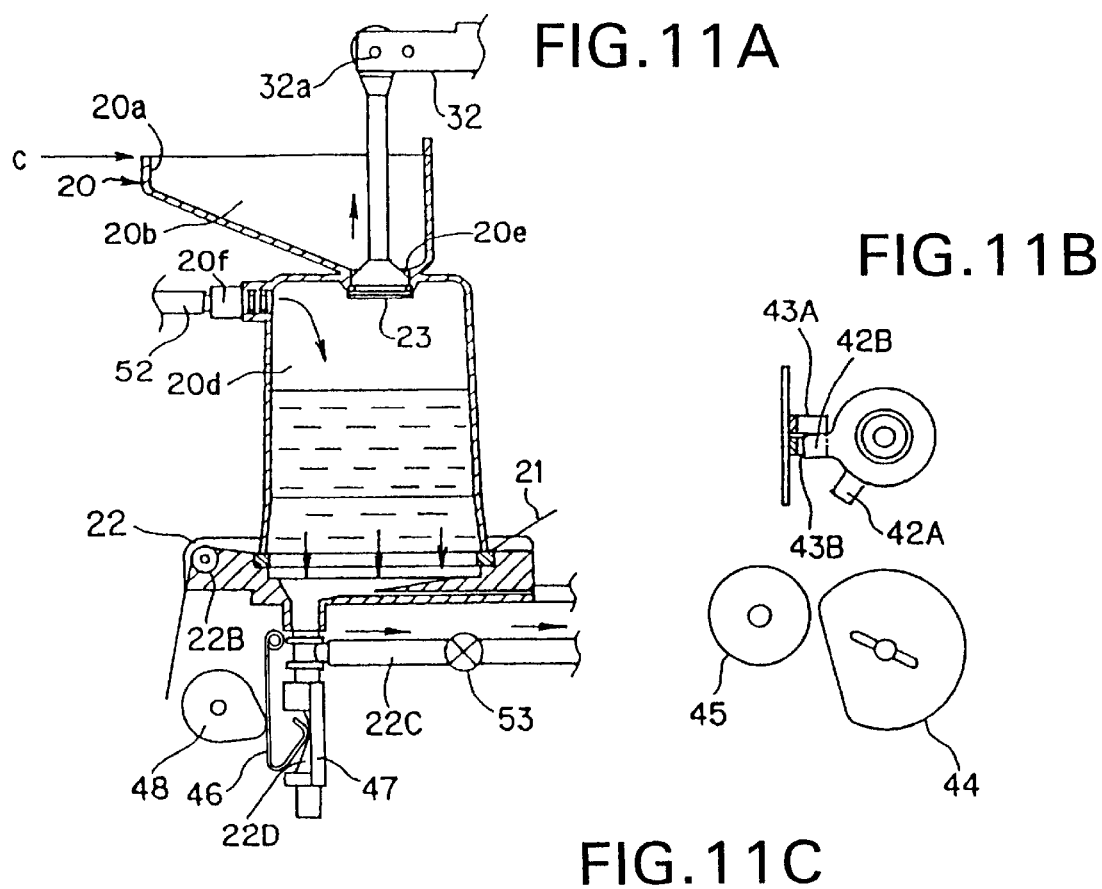
FIG.11A
FIG.11B
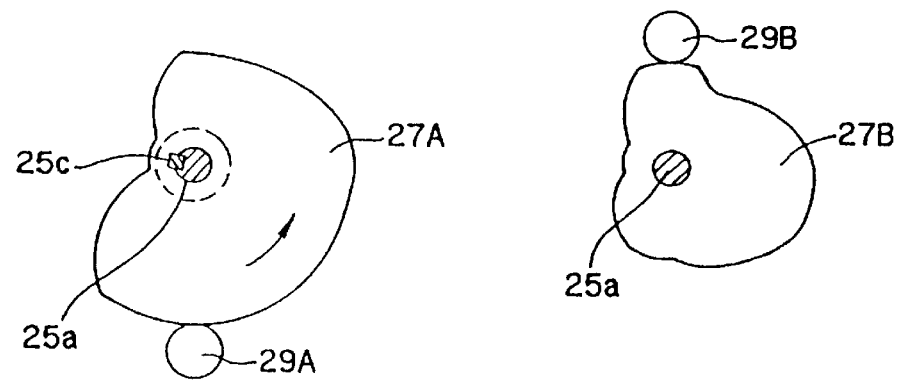
FIG.11C
FIG.11D
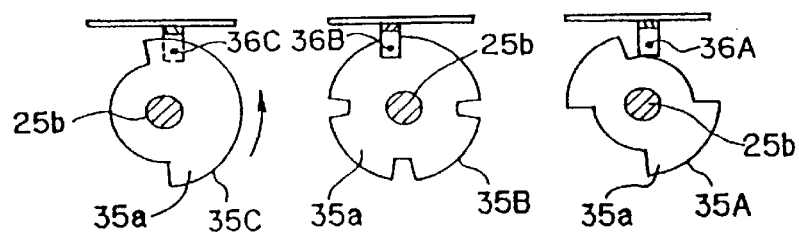

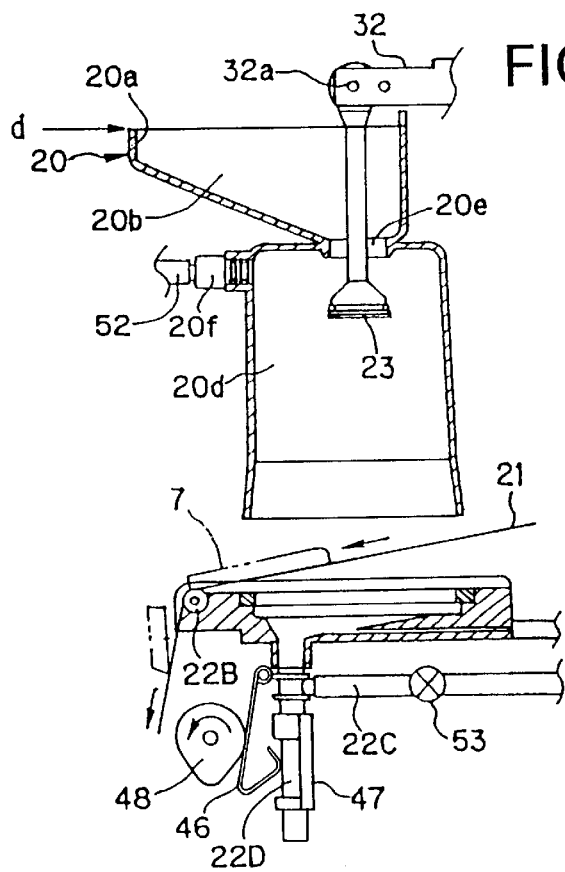
FIG.13A
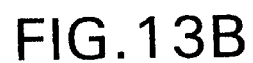
FIG.13B
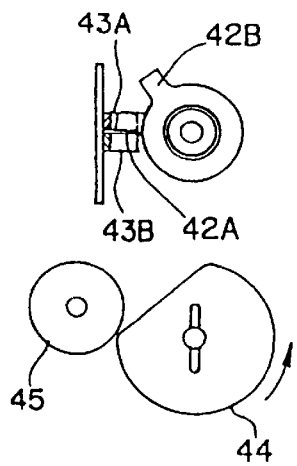
FIG.13C
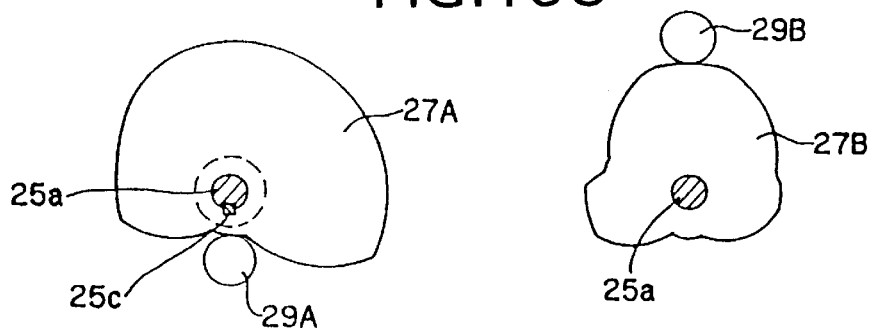
FIG.13D
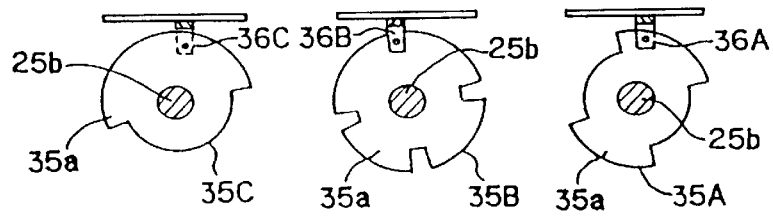

PAPER FILTER FEEDER FOR BEVERAGE EXTRACTOR

FIELD OF THE INVENTION

The invention relates to a paper filter feeder for beverage extractors that is used in cup type vending machines and the like wherein coffee, black tea, oolong tea, green tea and the like are extracted from beverage materials to perform cup selling. More particularly, the invention is directed to a paper filter feeder for beverage extractors that is not limited in the type of paper filters used, can accurately detect the exhaustion of the paper filter when the paper filter has been completely used up without leaving any filter residue, and, in addition, does not soil hands of a person responsible for the replacement of the paper filter and permits the paper filter to be easily replaced even though the working space is narrow.

BACKGROUND OF INVENTION

Conventional beverage extractors widely known for application to vending machines and the like are provided with a paper filter feeder that feeds a paper filter for extraction into an extraction chamber where a beverage material, such as a coffee powder, is mixed with hot water to extract a beverage.

A conventional paper filter feeder for beverage extractors is shown in FIG. 1. This paper filter feeder comprises: a rotatable roll core 101 around which a paper filter 100 is wound; a remaining filter detection lever 103, with the center or the front end thereof abutted against the rolled paper filter 100, that is displaced in a direction indicated by an arrow B with a reduction in the amount of the paper filter 100 left; and a microswitch 104 which, when the remaining filter detection lever 103 has reached a position indicated by a chain double-dashed line as a result of a reduction in the amount of the paper filter 100 left, permits a contactor 103A of the remaining filter detection lever 103 to press an actuator 105, whereby switching is performed to output a filter exhaustion signal to a controller (not shown). This paper filter feeder is constructed so that the paper filter 100 is drawn out in a direction indicated by an arrow A through a guide roller 102 and is fed into an extraction chamber (not shown).

In the above construction, upon request of selling, in the extraction chamber, a mixture of the beverage material with hot water is filtered through a paper filter to extract a beverage. After the completion of the extraction, the paper filter 100 is pulled out from the roll core 101 by means of a pair of filter delivery rollers (not shown) and fed in a direction indicated by the arrow A, thereby permitting a fresh surface of the paper filter 100 to be fed into the extraction chamber.

With the progress of selling in this way, a reduction in the amount of the paper filter 100 remaining unused causes displacement of the remaining filter detection lever 103 in a direction indicated by the arrow B. When the amount of the paper filter 100 remaining unused is reduced and the remaining filter detection lever 103 reaches a position indicated by a chain double-dashed line, a contactor 103A of the remaining filter detection lever 103 presses the actuator 105 of the microswitch 104. This leads to switching operation of the microswitch 104 which outputs a filter exhaustion signal to the controller to execute alarm output and the like.

The conventional paper filter feeder for beverage extractors, however, is disadvantageous in that, since whether or not there is still paper filter left is detected by a change in diameter of the paper filter roll, the position of the remaining filter detection lever mounted and the position of the microswitch mounted should be very accurately set so that as soon as the remaining filter detection lever reaches a diameter where no filter paper is left, the microswitch is turned on. For this reason, in order to avoid such a trouble that the exhaustion of the filter paper is not detected in spite of the fact that the paper filter has been used up, the microswitch is set so as to operate while leaving the paper filter, remaining unused, in an amount corresponding to several tens of cups. This poses a problem that a considerable amount of the paper filter is wasted.

In order to solve this problem, Japanese Patent Laid-Open No. 125298/1991 discloses a beverage extractor wherein a detector for detecting the final end of the paper filter is provided before the extraction chamber so that the exhaustion of the paper filter is detected based on the results of the detection provided by the detector. There are two types of paper filters, one of which has a final end fixed to the roll core and the other has a final end not fixed to the roll core. Disadvantageously, the above constructions cannot cope with the former paper filter.

Further, according to the conventional beverage extractors, when a new paper filter is set due to the exhaustion of the paper filter, the setting of the new paper filter is carried out by handwork. In this case, hands of a person who sets the new paper filter are soiled with extraction dregs deposited onto the guide roller and the shaft thereof. Furthermore, when the work space in the beverage extractor is narrow, it is difficult to perform setting of the new paper filter by handwork.

SUMMARY OF THE INVENTION

It is an object of the invention is to provide a beverage extractor that can accurately detect the exhaustion of a paper filter without limitation in the type of paper filters used.

It is another object of the invention to provide a paper filter feeder for beverage extractors that enables a paper filter to be replaced without soiling hands of a person who performs replacement work.

It is a further object of the invention to provide a paper filter feeder for beverage extractors that can facilitate the replacement of a paper filter even in a narrow work space.

In view of the above problems of the prior art, in order to accurately detect the exhaustion of a paper filter without limitation in the type of paper filters used, according to the first feature of the invention, a paper filter feeder for a beverage extractor comprises: feed means for feeding the paper filter into the extraction chamber; tension detection means for detecting the tension of the paper filter fed from the feed means; and remainder detection means for detecting, based on the tension, whether or not there is still paper filter remaining unused.

Further, in view of the above problems of the prior art, in order to permit replacement of a paper filter without soiling hands of a person who performs replacement work, even in a narrow work space, according to the second feature of the invention, a paper filter feeder for a beverage extractor comprises: a delivery roller for feeding the used paper filter into a nip created between the delivery roller and a guide roller and intermittently delivering the used paper filter in a predetermined delivery direction; guide means for guiding a paper filter to be newly set into the nip between the guide roller and the delivery roller; and delivery roller drive means which, when the new filter paper has been guided to the nip, drives the delivery roller to feed the new paper filter into the nip between the delivery roller and the guide roller and to deliver the new paper filter in the predetermined direction.

Preferably, the feed means is a roll core around which the paper filter is wound with the final end of the paper filter fixed on the core, the tension detection means is a lever comprising a free end mounted on the filter paper rewound from the roll core and a hinged end which, upon an increase in tension of the paper filter as a result of exhaustion of the paper filter, is rotated in a first direction due to the displacement of the free end, and the remainder detection means comprises a sensor for detecting the rotation of the hinged end. Photosensors and the like may be used as the sensor.

Alternatively, preferably, the feed means is a roll core around which the paper filter is wound with the final end of the paper filter not fixed on the core, the tension detection means is a lever comprising a free end mounted on the filter paper rewound from the roll core and a hinged end which, upon a reduction in tension of the paper filter as a result of exhaustion of the paper filter, is rotated in a second direction due to the displacement of the free end, and the remainder detection means comprises a sensor for detecting the rotation of the hinged end. Photosensors and the like may be used as the sensor.

The drive means is preferably constructed so as to be driven by the operator's driving operation.

Preferably, the guide means comprises: a rod member having a front end for guiding the paper filter into the nip between the delivery roller and the guide roller; and a detector for detecting the completion of the guiding operation of the rod member to output a detection signal, and the drive means is driven based on the detection signal.

Preferably, the delivery roller comprises first and second rollers provided on a drive shaft while leaving a spacing therebetween according to the width of the paper filter, the guide roller comprises first and second guide rollers respectively in elastic pressure contact with the first and second delivery rollers, and the guide means comprises a rod member having a front end that passes around a straight line connecting the nip between the first delivery roller and the first guide roller to the nip between the second delivery roller and the second guide roller.

Preferably, the guide means comprises: rod member drive means that allows the rod member to guide the paper filter and, upon the completion of the guiding operation, returns the rod member to the original position; and a detector that detects the return of the rod member to the original position to output a detection signal for stopping the rod member drive means.

BRIEF DESCRIPTION OF THE DRAWINGS

The invention will be described in more detail in conjunction with the accompanying drawings, wherein:

FIG. 7 is a diagram illustrating output signals in the first, second, and third step sensors according to the first preferred embodiment of the invention;

FIGS. 9A to 9D are; diagram illustrating a closed state of a waste pipe according to the first preferred embodiment of the invention;

FIGS. 11A to 11D are; a diagram illustrating the step of extraction according to the first preferred embodiment of the invention;

FIGS. 13A to 13D are a diagram illustrating the state of completion of the step of disposal of dregs according to the first preferred embodiment of the invention;

DETAILED DESCRIPTION OF PREFERRED EMBODIMENTS

A paper filter feeder for beverage extractors according to the invention will be explained in detail in conjunction with the accompanying drawings.

Figure 2:
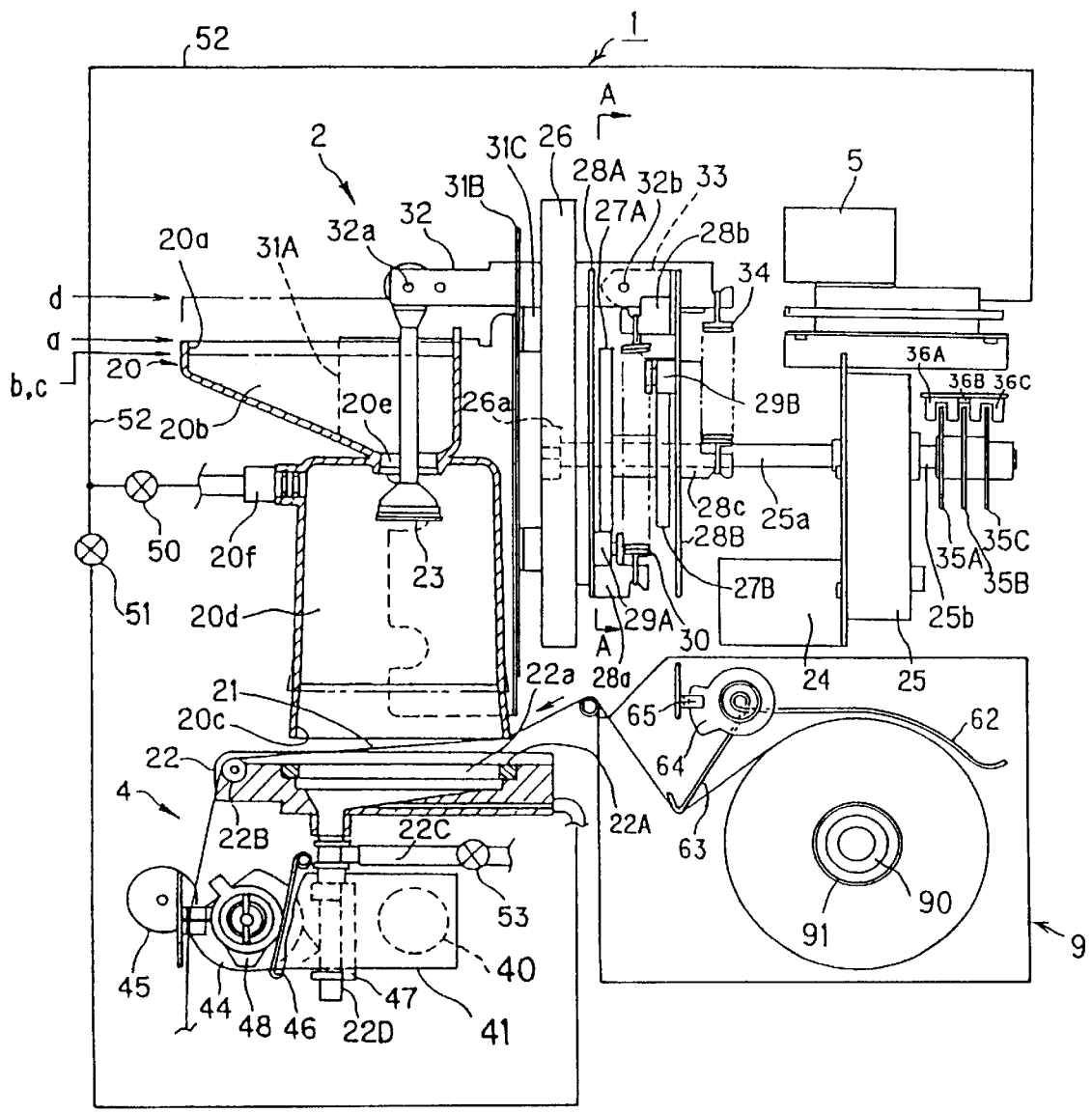
FIG. 2 is an explanatory view of a beverage extractor according to the first preferred embodiment of the invention.

FIG. 2 is a beverage extractor according to the first preferred embodiment of the invention. This beverage extractor 1 comprises: an extraction section 2 for extracting a beverage from a mixture of a powder material, such as a coffee powder, with hot water; a waste disposer 4 that disposes of dregs or the like; an air pump 5 for feeding pressurized air into each section of the beverage extractor 1;

and a paper filter feeder 6 for feeding a paper filter 21 which will be described later.

The extraction section 2 is supported vertically movably by a guide rail (not shown). The extraction section 2 comprises: a cylinder 20 that agitates a mixture of the powder material with hot water fed from the upper part and discharges the agitated mixture downward; a paper filter 21 that is disposed below the cylinder 20 and filters the mixture discharged from the cylinder 20; and a beverage receiver 22 for receiving a beverage which has been extracted by filtration through the paper filter 21.

The cylinder 20 comprises: a mixing chamber 20b for receiving the powder material and hot water fed through a feed port 20a provided in the upper part; and an extraction chamber 20d that discharges the mixture of the powder material with hot water through an discharge port 20c provided in the lower part to perform the step of extracting a beverage. The mixing chamber 20b and the extraction chamber 20d are communicated with each other through a communicating port 20e. The communicating port 20e is constructed so as to be opened or closed by a valve 23. The extraction chamber 20d has an introduction port 20f for introducing pressurized air from an air pump 5.

The paper filter 21 is constructed so as to be pulled out from the paper filter feeder 6 in the left direction in FIG. 1 by drive of a disposal motor 40 in the disposer 4 which will be described later.

The paper filter feeder 9 comprises: a roll core 91 that is supported rotatably on a supporting shaft 90 and has a paper filter 21 wound therearound; a filter cover 92 with a rotatably supported base end, the front end side from the middle portion of the filter cover being abutted against the rolled paper filter 21; a remaining filter detection lever 93, with a rotatably supported base end, which, when mounted on the paper filter 21 with the front end being drawn out, can detect the exhaustion of the paper filter 21, that is, is displaced in response to the tension of the drawn paper filter 21; an encoder 94 that is displaced in synchronization with the remaining filter detection lever 93; and a remaining filter detection sensor 95, such as a photosensor, that, when the remaining filter detection lever 93 and the encoder 94 are displaced to a predetermined position as a result of the exhaustion of the paper filter 21, is turned on due to removal of light shielding by the encoder 94 and outputs a filter exhaustion signal, indicating the exhaustion of the paper filter 21, to a controller 7 which will be described later.

The remaining filter detection lever 93 is constructed so that, when the final end of the paper filter 21 is fixed to the roll core 91, the remaining filter detection lever 93 is rotated clockwise upon an increase in tension of the drawn paper filter 21 due to the exhaustion of the paper filter 21, while, when the final end of the paper filter 21 is not fixed to the roll core 91, the remaining filter detection lever 93 is rotated counterclockwise upon a reduction in tension of the drawn paper filter 21 due to the exhaustion of the paper filter 21.

The beverage receiver 22 comprises: an opening 22a in its upper part; a rubber packing 22A that, when the cylinder 20 (discharge port 20c) is abutted against the periphery of the opening 22a, prevents the mixture from leaking; a roller 22B, provided at the end portion, that guides the travel of the paper filter 21; and, in the lower part, a beverage feed pipe 22C for feeding a beverage to the cup side and a waste pipe 22D for disposal of a beverage. The beverage feed pipe 22C is provided with a beverage feed solenoid 53.

The extraction section 2 comprises: an extraction motor 24; a reduction gear 25 which has output shafts 25a, 25b protruded respectively from both sides thereof and reduces the number of revolutions of the extraction motor 24 to a predetermined value; a support plate 26 that supports one end of one output shaft 25a by means of a bearing 26a; a cylinder cam 27A and a valve cam 27B fixed to one output shaft 25a; a cylinder drive plate 28A for driving the cylinder 20; a valve drive plate 28B for driving the valve 23; a cylinder cam follower 29A mounted on the cylinder drive plate 28A; a valve cam follower 29B mounted on the valve drive plate 28B; a tension coil spring 30 that has both ends locked respectively to a locking member 28a mounted on the cylinder drive plate 28A and a locking member 28b mounted on the valve drive plate 28B and functions to draw the cylinder drive plate 28A and the valve drive plate 28B up to each other, whereby the cylinder cam follower 29A and the valve cam follower 29B are abutted respectively against the cylinder cam 27A and the valve cam 27B; a plurality of connecting members 31A, 31B, and 31C connecting the cylinder 20 to the cylinder drive plate 28A; a lever 32 that is rotatably connected by a pin 32a on the front end side to the valve 23; a connecting member 33 that is mounted on the valve drive plate 28B and rotatably connected by a pin 32b to the lever 32; and a tension coil spring 34 that has both ends respectively locked to the lever 32 in its rear end side and the locking member 28c mounted on the valve drive plate 28B. This extraction section 2 is constructed so that upon rotation, by one turn, of the output shafts 25a, 25b and the output shaft of the reduction gear 41 of the disposal motor 40, a series of steps of agitation, extraction, and disposal of dregs are completed.

A step detection mechanism for detecting the advance of each step is provided on the other output shaft 25b side of the reduction gear 25. Specifically, first, second, and third step detection plates 35A, 35B, and 35C are mounted on the other output shaft 25b of the reduction gear 25. First, second, and third step detection sensors 36A, 36B, and 36C, such as photosensors which, for example, are turned off by light shielding, for detecting the position of rotation of the first, second, and third step detection plates 35A, 35B, and 35C, are disposed around the first, second, and third step detection plates 35A, 35B, 35C.

An air pipe 52 communicated with the introduction port 20f of the extraction chamber 20d and the beverage receiver 22 is connected to the air pump 5. The air pipe 52 is provided with an upper air solenoid 50 before the introduction port 20f of the extraction chamber 20d and a lower air solenoid 51 before the beverage receiver 22.

Figure 1:
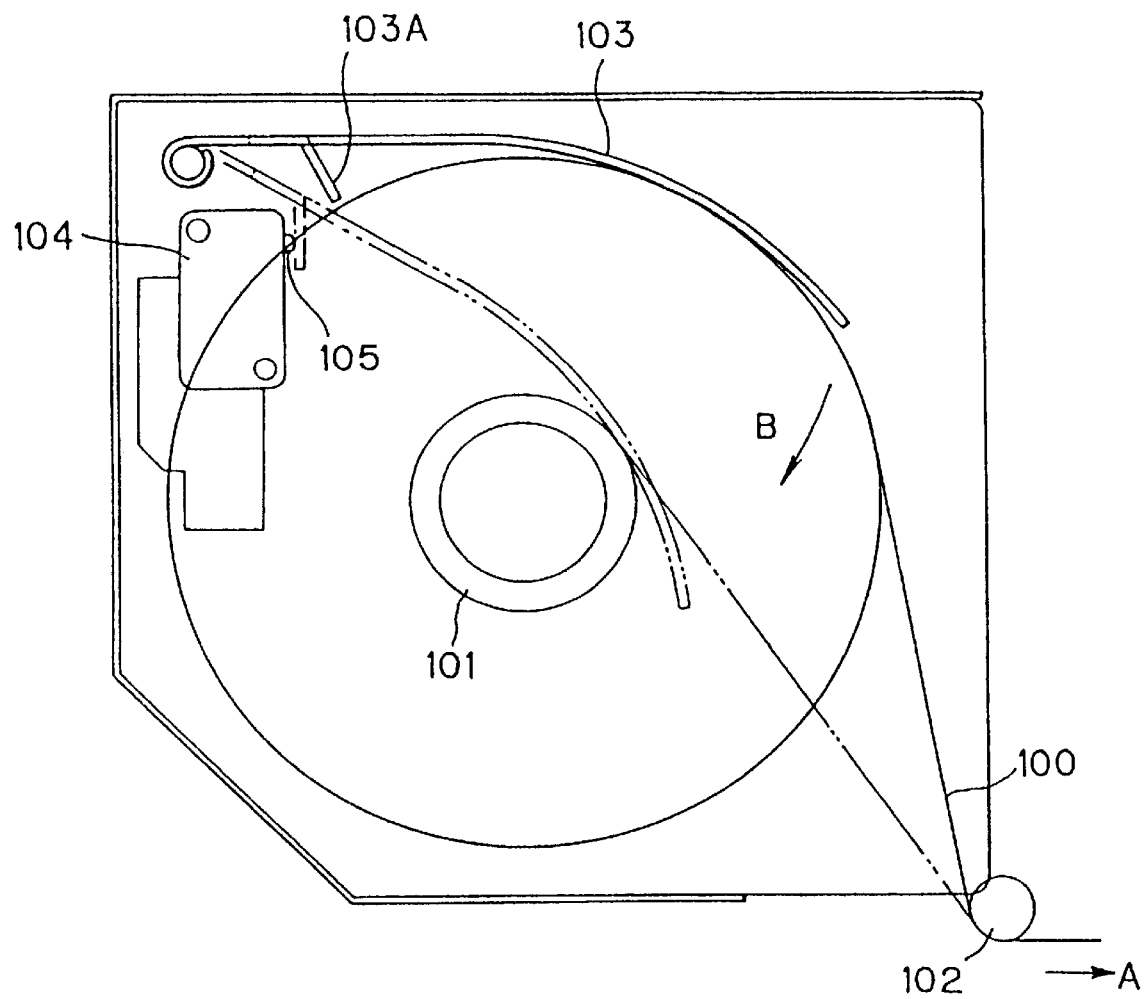
FIG. 1 is an explanatory view of a conventional paper filter feeder for beverage extractors.
Figure 3:
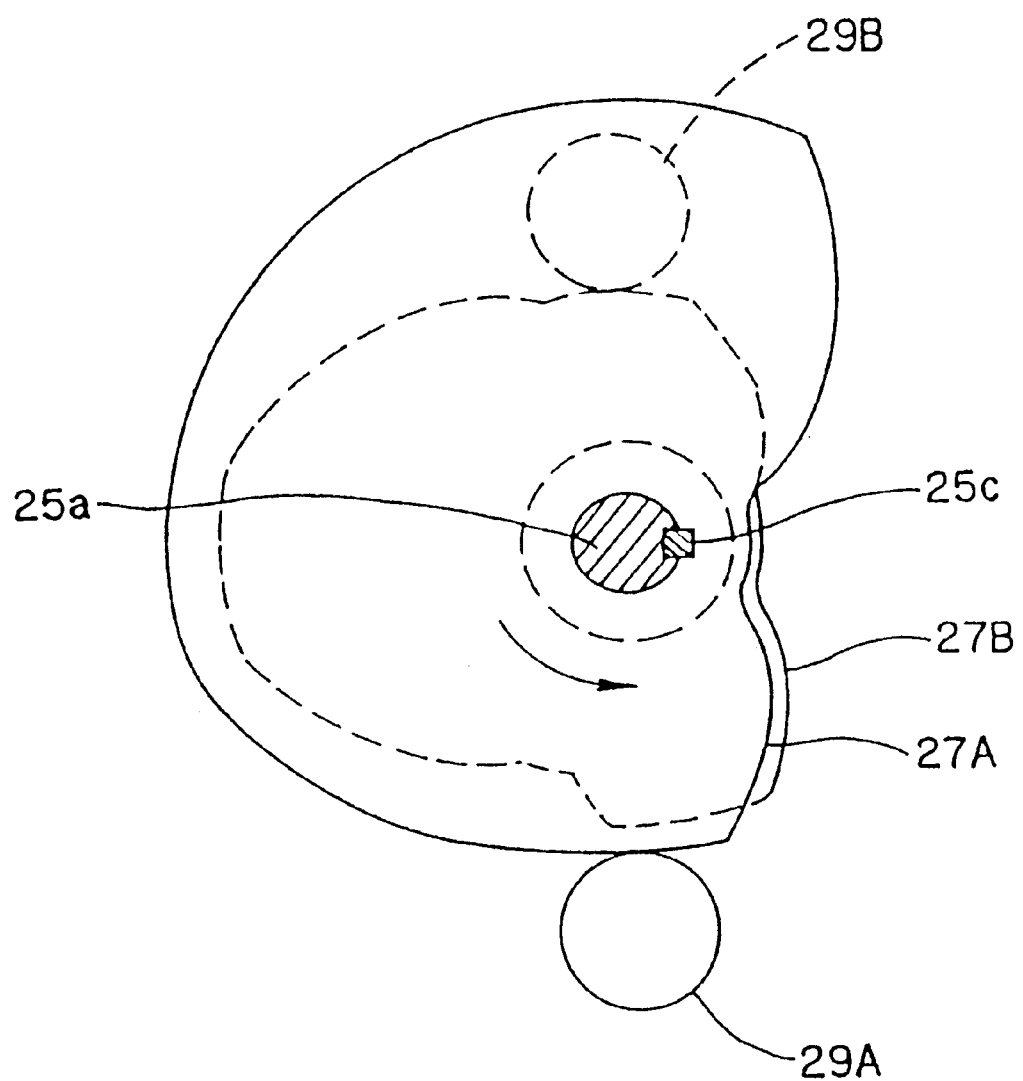
FIG. 3 is a cross-sectional view taken on line A—A of FIG. 2.

FIG. 3 is a cross-sectional view taken on line A—A of FIG. 1. The cylinder cam 27A and the valve cam 27B are fixed by a key 25c to one output shaft 25a, and the cam face of the cylinder cam 27A and the cam face of the valve cam 27B are formed as shown in the same drawing.

Figure 4:
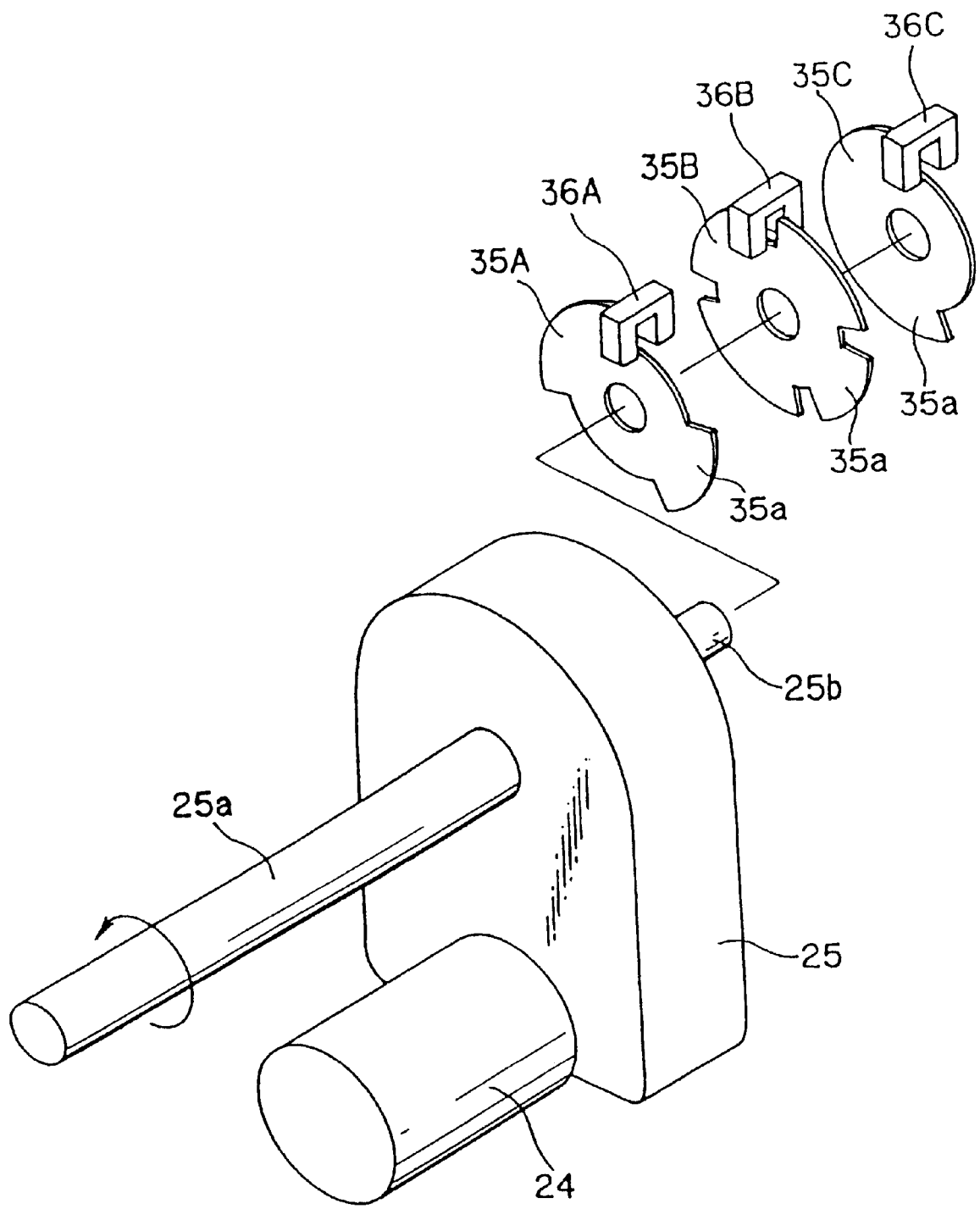
FIG. 4 is a perspective view of a step detection mechanism according to the first preferred embodiment of the invention.

FIG. 4 is a perspective view of a step detection mechanism. In the first step detection plate 35A, a protrusion 35a is provided over about 90° in two places. In the second step detection plate 35B, a protrusion 35a is provided over about 70° in four places.

In the third step detection plate 35C, a protrusion 35a is provided over about 180° in one place.

Figure 5:
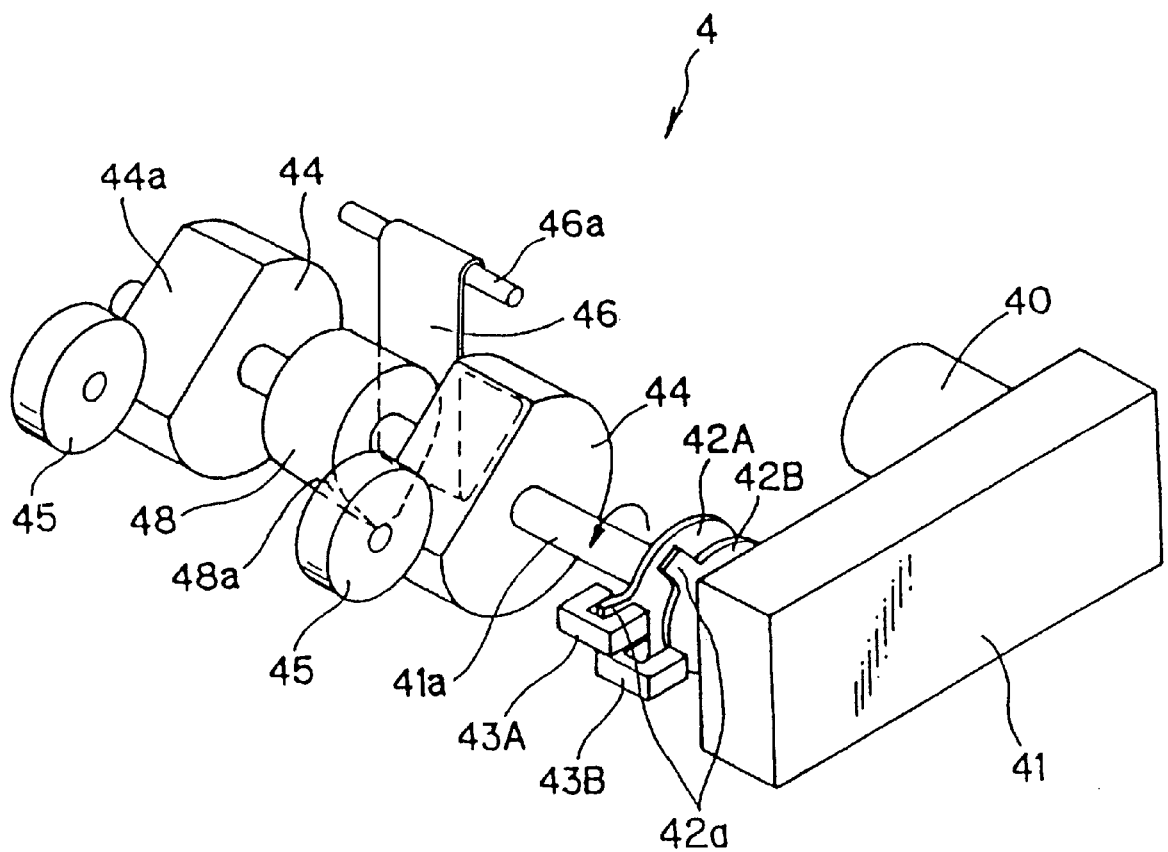
FIG. 5 is a perspective view of a disposer in its principal part according to the first preferred embodiment of the invention.

FIG. 5 is a perspective view of a disposer 4 in its principal section. The disposer 4 comprises: a disposal motor 40; a reduction gear 41 for reducing the number of revolutions of the disposal motor 40 to a predetermined value; a waste pipe opening detection plate 42A and a waste pipe closing detection plate 42B mounted on the output shaft 41a of the reduction gear 41; a waste pipe opening detection sensor 43A, such as a photosensor, that, upon light shielding (for example, off) by a protrusion 42a of the waste pipe opening detection plate 42A, outputs an off signal indicating the state of opening (the state of stand-by) of the waste pipe 22D; a waste pipe closing detection sensor 43B, such as a photosensor, that, upon light shielding (for example, off) by a protrusion 42a of the waste pipe closing detection plate 42B, outputs an off signal indicating the state of closing of the waste pipe 22D; a pair of filter delivery rollers 44 that have a cutout portion 44a on a circumference, are mounted on the output shaft 41a, and deliver the paper filter 21 by a given length; a pair of guide rollers 45 that press the paper filter 21 against the side of the pair of the filter delivery rollers 44 by means of a spring (not shown); a pressing plate 46, comprising a plate spring, that is rotatably supported by a spindle 46a and, together with the fixing plate 47 (see FIG. 2), pressure-closes the waste pipe 22D; and a pressing cam 48 that is mounted on an output shaft 41a and has a protrusion 48a on a circumference with the pressing plate 46 being rotated thereon.

Figure 6:
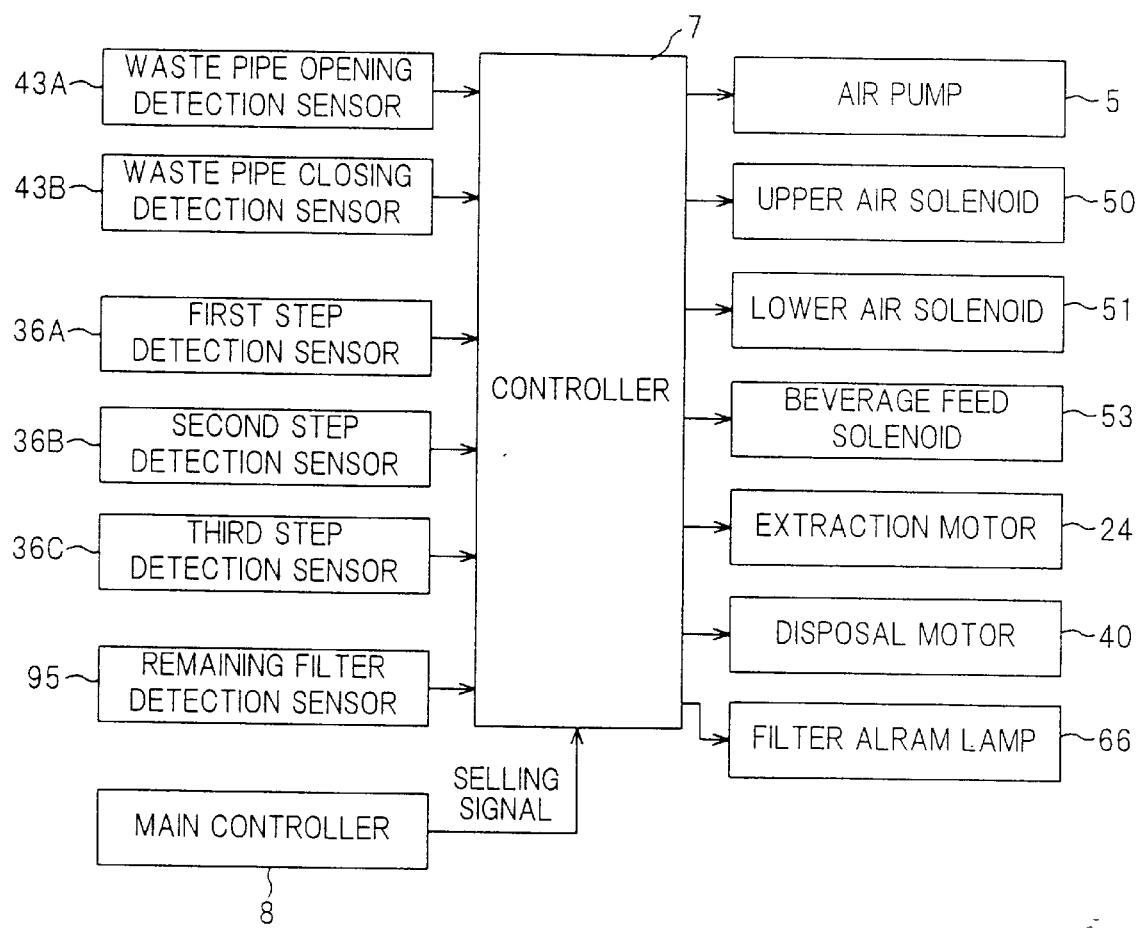
FIG. 6 is a block diagram showing a control system according to the first preferred embodiment of the invention.
Figure 8A:
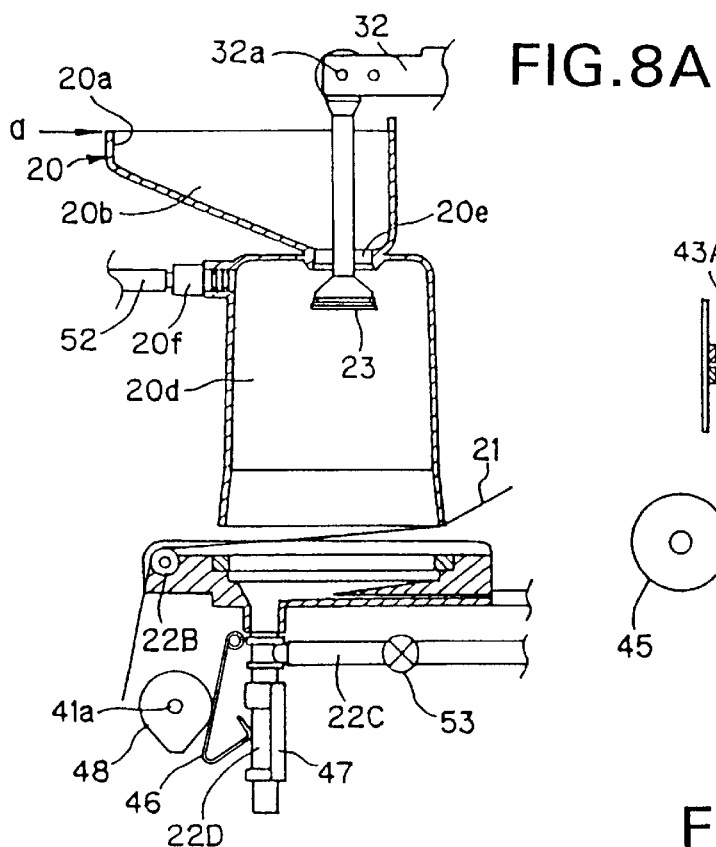
FIGS. 8A to 8D are; diagram illustrating the state of stand-by according to the first preferred embodiment of the invention.
Figure 8B:
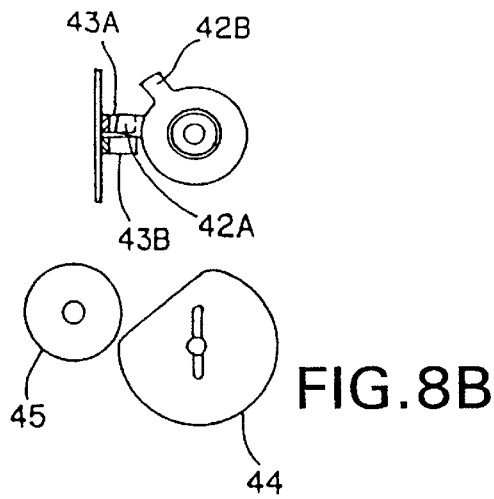
Figure 8C:
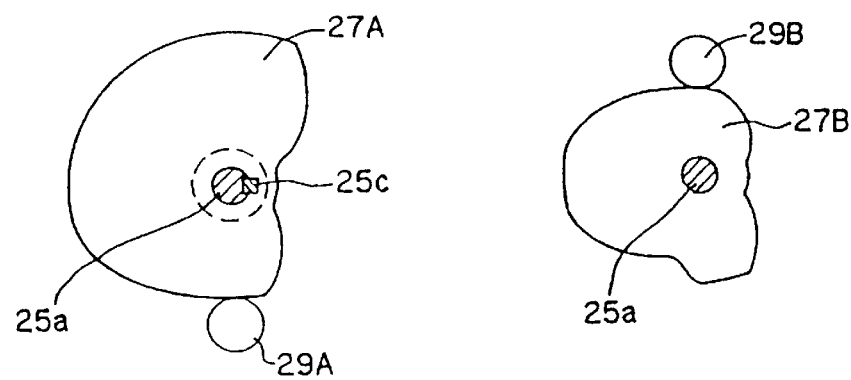
Figure 8D:
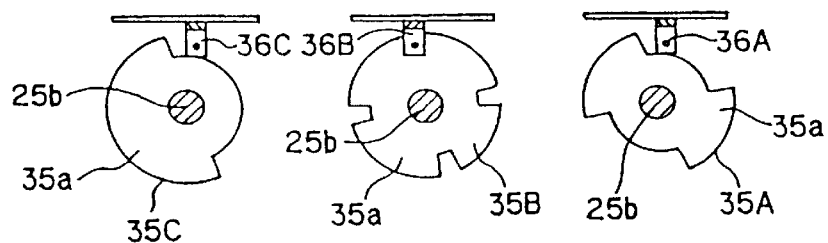

FIG. 6 shows a control system of the beverage extractor 1. The beverage extractor 1 has a controller 7 that controls each section of the extractor 1. The controller 7 is connected to the waste pipe opening detection sensor 43A, the disposable pipe closing detection sensor 43B, the first, second, and third step detection sensors 36A, 36B, and 36C, the remaining filter detection sensor 95, the air pump 5, the upper air solenoid 50, the lower air solenoid 51, the beverage feed solenoid 53, the extraction motor 24, the disposal motor 40, and the filter alarm lamp 66. Further, it is connected to a main controller 8 that controls selling of the extracted beverage. The filter alarm lamp 66, when the controller 7 receives a filter exhaustion signal from the remaining filter detection sensor 95, is turned on to indicate the exhaustion of the paper filter 21.

The main controller 8 outputs a selling signal upon each request of selling of the extracted beverage, and the controller 7, upon receipt of the selling signal from the main controller 8, controls the extraction motor 24, the disposal motor 40, and the air pump 5 to perform beverage extraction control, that is, a series of steps of agitation, extraction, and disposal of dregs.

Figure 14:
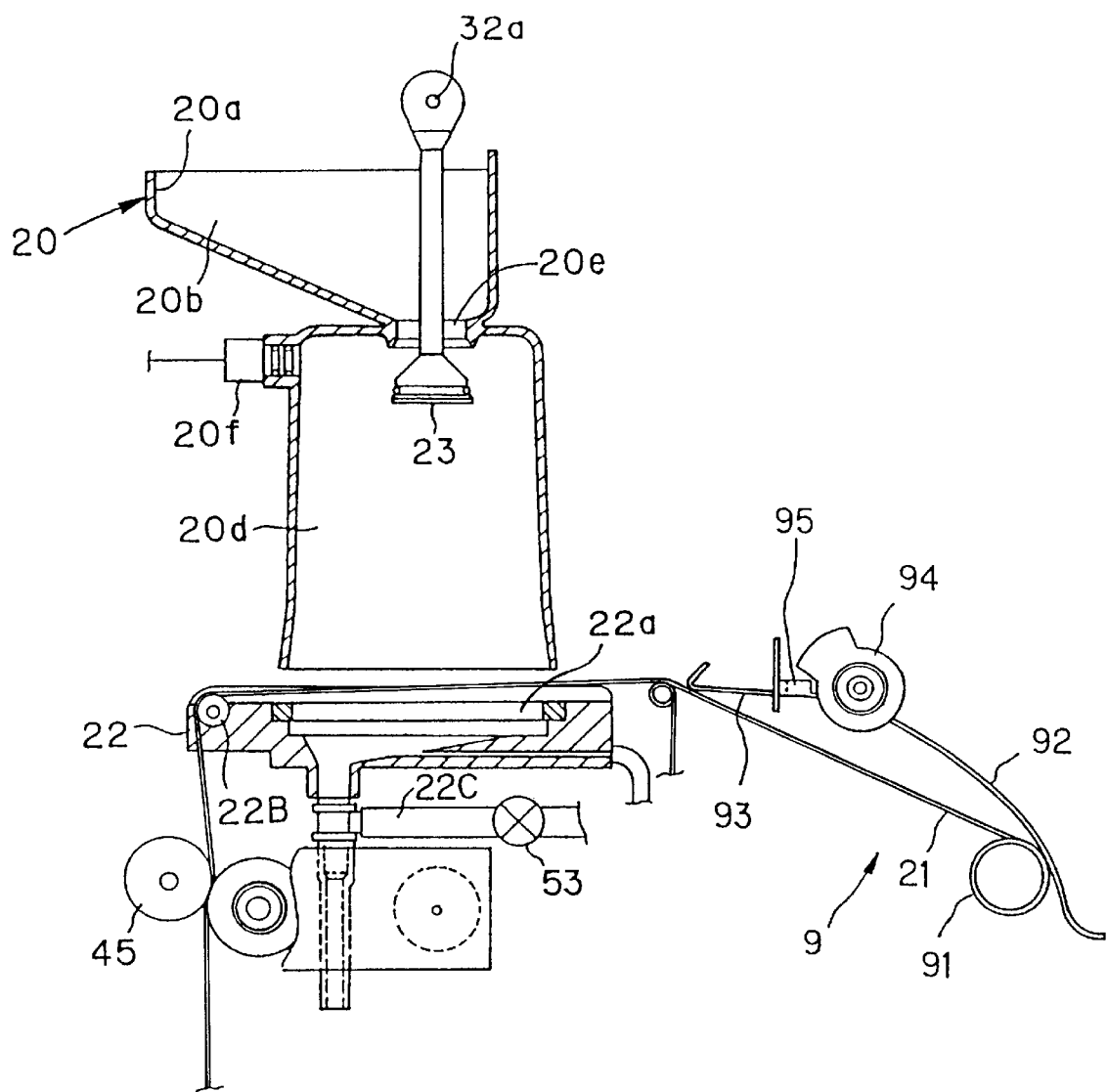
FIG. 14 is a diagram illustrating an operation, according to the first preferred embodiment of the invention, conducted when a paper filter has been used up.
Figure 15:
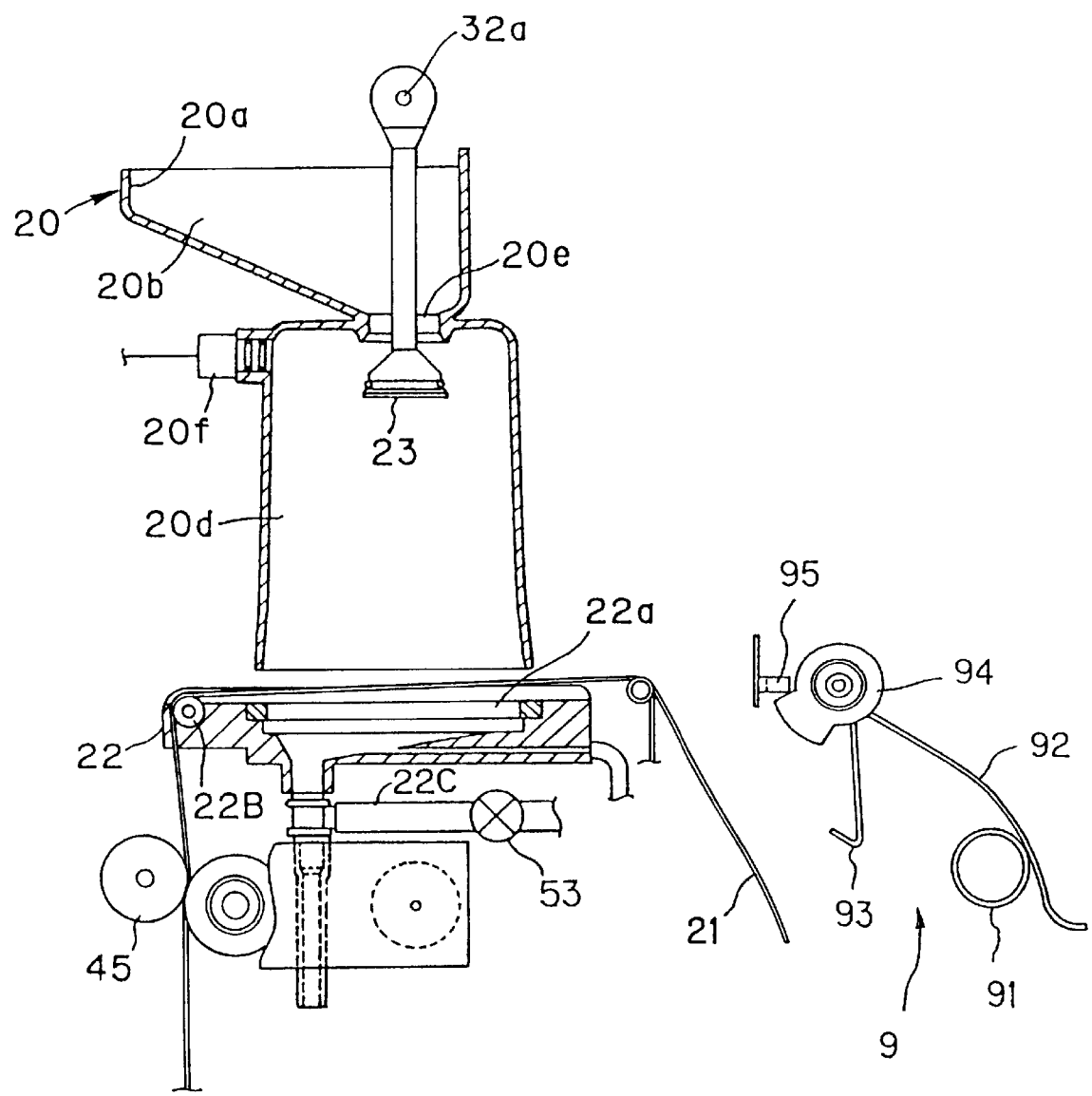
FIG. 15 is a diagram illustrating an operation, according to the first preferred embodiment of the invention, conducted when a paper filter has been used up.

Next, the operation of the beverage extractor 1 will be explained in conjunction with FIGS. 7 to 15. FIG. 7 is a diagram showing output signals of the first, second, and third step detection sensors 36A, 36B, and 36C. FIGS. 8 to 13 are diagrams showing the-operation of the extractor 1. In each of FIGS. 8 to 13, (a) shows the positions of principal parts (a cylinder 20, a valve 23 and the like), (b) the positions of the waste pipe opening detection plate 42A, the waste pipe closing detection plate 42B, and the filter delivery roller 44, (c) the positions of the cylinder cam 27A and the valve cam 27B, and (d) the positions of the first, second, and third step detection plates 35A, 35B, and 35C. FIGS. 14 and 15 are diagrams showing the operation upon exhaustion of the paper filter 21.

(1) Stand-by State (see FIG. 8)

In the stand-by state, the principal part of the extractor 1 is at the stand-by position $P_1$ shown in FIG. 7, that is, is in a state shown in FIG. 8. Specifically, the first, second, and third step detection sensors 36A, 36B, and 36C are in the on state, the waste pipe opening detection sensor 43A is in the off state, and the waste pipe closing detection sensor 43B is in the on state. A small gap is provided between the filter delivery roller 44 and the guide roller 45 so that, upon rotation of the filter delivery roller 44, the paper filter 21 is not moved at all. The pressing plate 46 is abutted against the pressing cam 48 through the elastic force of the waste pipe 22D.

(2) Step of Agitation (see FIGS. 9 and 10)

Upon receipt of a selling signal from the main controller 8, the controller 7, when the second step detection sensor 36B is in the on state, performs the operation of movement from the stand-by position $P_1$ to the agitation position $P_2$ based on "on" of the first and third step detection sensors 36A and 36C. Specifically, the controller 7 drives the disposal motor 40 in a forward direction (in FIG. 9(a), the output shaft 41a is driven counterclockwise). The drive torque of the disposal motor 40 is transmitted through a reduction gear 41 to the output shaft 41a, and the output shaft 41a is rotated in a forward direction by about 60° (rotation in a counterclockwise direction in FIG. 9(a)) through a reduction gear 41. As a result, as shown in FIG. 9(a), the protrusion 48a of the pressing cam 48 presses the pressing plate 46 so that the waste pipe 22D is closed between the pressing plate 46 and the fixing plate 47. The waste pipe closing detection sensor 43B is subjected to light shielding by the protrusion 42a of the waste pipe closing detection plate 42B to output an off signal to the controller 7. The controller 7 stops the drive of the disposal motor 40 based on the off signal from the waste pipe closing detection sensor 43B.

Figure 10A:
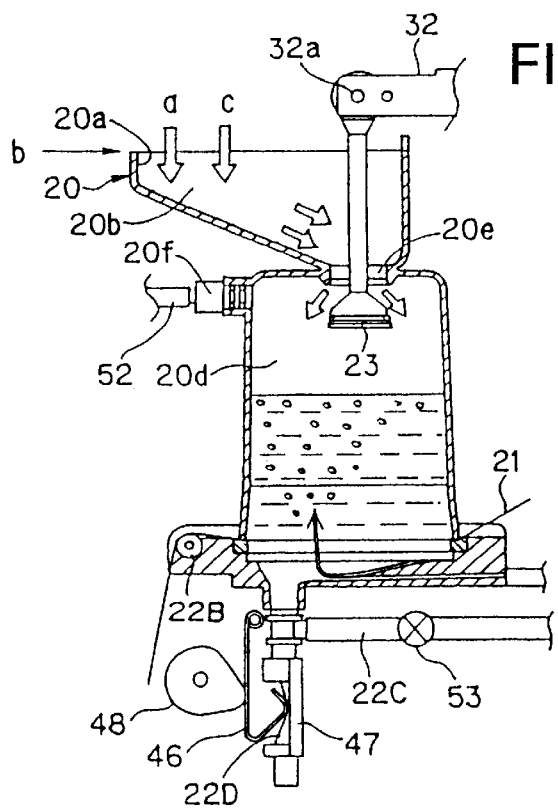
FIGS. 10A to 10D are; a diagram illustrating the step of agitation according to the first preferred emodiment of the invention.
Figure 10B:
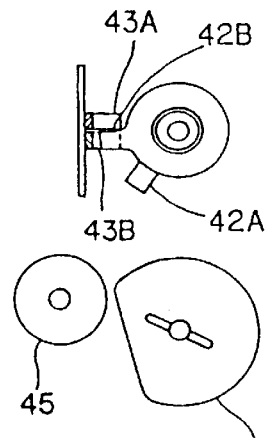
Figure 10C:
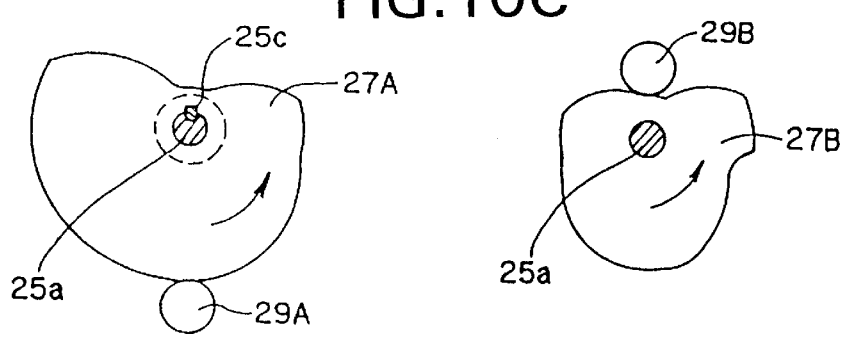
Figure 10D:
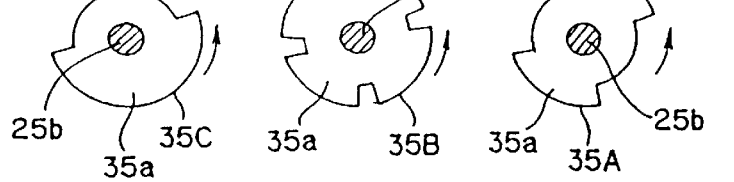
Figure 12A:
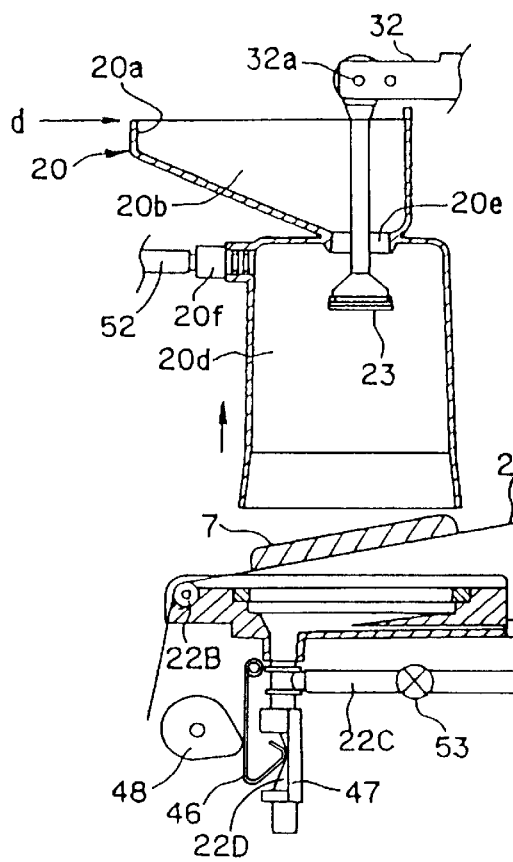
FIGS. 12A to 12D are a diagram illustrating the step of disposal of dregs according to the first preferred embodiment of the invention.
Figure 12B:
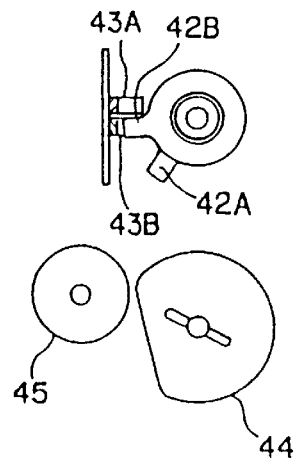
Figure 12C:
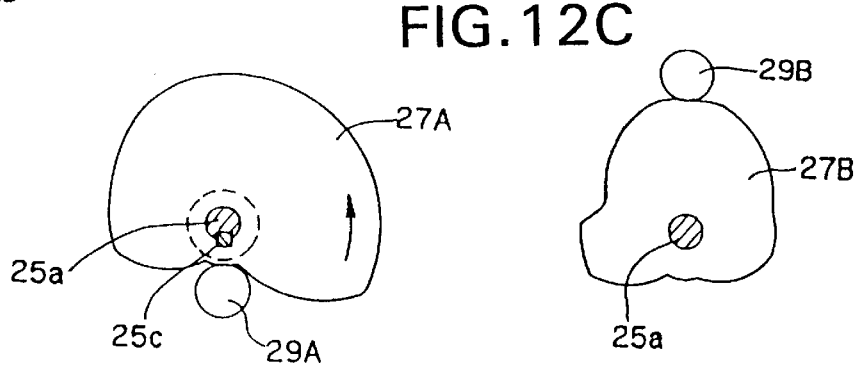
Figure 12D:
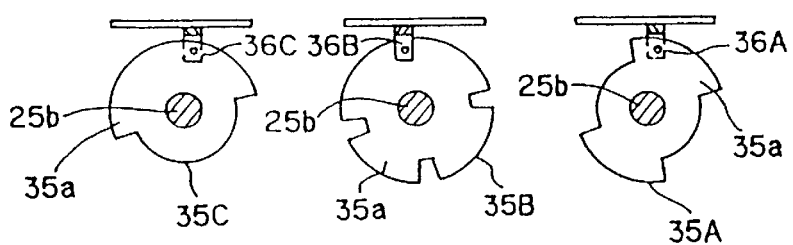

Subsequently, the controller 7 drives the extraction motor 24 in a forward direction (in FIG. 10(d), the output shaft 25b is rotated in a counterclockwise direction). The drive torque of the extraction motor 24 is transmitted to the output shafts 25a, 25b through the reduction gear 25. This permits the output shafts 25a, 25b to be rotated in a forward direction (in FIG. 10(d), they are rotated counterclockwise), and, in FIG. 10(c), the cylinder cam 27A and the valve cam 27B are rotated in a forward direction, so that the cylinder drive plate 28A and the valve drive plate 28B descend. As soon as the cylinder drive plate 28A descends, the cylinder 20 descends through a plurality of connecting members 31A, 31B, and 31C. This causes the lower end of the extraction chamber 20d to abut the paper filter 21 against the beverage receiver 22. On the other hand, as soon as the valve drive plate 28B descends, the valve 23 also descends through the connecting member 33 and the lever 32. The first step detection sensor 36A is subjected to light shielding by the first step detection plate 35A and outputs an off signal to the controller 7. The second step detection sensor 36B then outputs an on signal to the controller 7. The controller 7, when the second step detection sensor 36B is in the on state, stops the drive of the extraction motor 24 based on "off" of the first step detection sensor 36A. The principal part of the extractor 1 reaches the agitation position $P_2$ shown in FIG. 7, that is, becomes a state shown in FIG. 10. In the state shown in FIG. 10, as shown in FIG. 10(d), the second and third step detection sensors 36B and 36C are not subjected to light shielding by the protrusion 35a of the second and third step detection plates 35B and 35C and hence each output an on signal to the controller 7.

The controller 7, when the second step detection sensor 36B is in the on state, performs the step of agitation based on "off" of the first step detection sensor 36A and "on" of the third step detection sensor 36C. Specifically, the controller 7 outputs a feed request signal for a powder material and hot water to the main controller 8. A powder material and hot water are fed into the mixing chamber 20b in its feed port 20a by the control of the main controller 8. The controller 7, according to the feed of the powder material and hot water, closes the beverage feed solenoid 53, opens the lower air solenoid 51, and drives the air pump 5. The air pump 5 feeds pressurized air to the beverage receiver 22 through an air pipe 52. This pressurized air passes through the paper filter 21 and flows into the extraction chamber 20d. When the pressurized air passes through the mixture within the extraction chamber 20d, the stream of air bubbles acts so as to agitate the mixture. Feed of pressurized air from below the paper filter 21 accelerates the elution of the powder material component into hot water and results in extraction of a beverage in a short time.

(3) Step of Extraction (see FIG. 11)

The controller 7, when the agitation time set by a timer elapses, rotates the extraction motor 24 in a forward direction. The drive torque of the extraction motor 24 is transmitted to the output shafts 25a, 25b through the reduction gear 25 to rotate the cylinder cam 27A and the valve cam 27B in a forward direction. As shown in FIG. 11(c), since the radius of the cylinder cam 27A does not change, the cylinder 20 is not vertically moved. On the other hand, since the radius of the valve cam 27B is increased, the valve 23 ascends, and, as shown in FIG. 11(a), closes a communicating port 20e. The third step detection sensor 36C is subjected to light shielding by the third step detection plate 35C and outputs an "off" signal to the controller 7. The second step detection sensor 36B then outputs an on signal to the controller 7. The controller 7, when the second step detection sensor 36B is in the on state, stops the drive of the extraction motor 24 based on "off" of the third step detection sensor 36C. The principal part of the extractor 1 reaches the extraction position $P_3$ shown in FIG. 7, that is, becomes a position shown in FIG. 11(d). In the state shown in FIG. 11, as shown in FIG. 11(c), the first and second detection sensors 36A, 36B are turned on.

The controller 7, when the second step detection sensor 36B is in the on state, the step of extraction is carried out based on "on" of the first step detection sensor 36A and "off" of the third step detection 36C. Specifically, the controller 7 opens the upper air solenoid 50, closes the lower air solenoid 51, opens the beverage feed solenoid 53, and drives the air pump 5 to feed the pressurized air from the air pump 5 through the air pipe 52 into the extraction chamber 20d in its introduction port 20f provided in the upper part thereof. The mixture within the extraction chamber 20d is forcibly fed downward by the pressurized air from the air pump 5 and filtered through the paper filter 21. The beverage which has been filtered through the paper filter 21 is fed on the side of a cup through the beverage receiver 22 and the beverage feed pipe 22C. Feed of the pressurized air into the extraction chamber 20d increases the air pressure within the extraction chamber 20d, permitting the mixture to be depressed on the paper filter 21 side. This realizes separation of the mixture into a beverage and dregs in a short time, that is, filtration with good efficiency.

(4) Step of Disposal of Dregs (see FIGS. 12 and 13)

When the extraction time set by the timer elapses, the controller 7 drives the extraction motor 24 in a forward direction. This permits the drive torque of the extraction motor 24 to be transmitted through the reduction gear 25 to the output shafts 25a, 25b that drive the cylinder cam 27A and the valve cam 27B in a forward direction. As a result, the cylinder drive plate 28A and the valve drive plate 28B ascend, and the cylinder 20 and the valve 23 ascend to the uppermost position. The first and third step detection sensors 36A, 36C are subjected to light shielding by the first and third step detection plates 35A, 35C and output an off signal to the controller 7. The second step detection sensor 36B then outputs an on signal to the controller 7. The controller 7, when the second step detection sensor 36B is in the on state, stops the drive of the extraction motor 24 based on "off" of the first and third step detection sensors 36A, 36C.

The principal part of the extractor 1 reaches the dreg disposal position $P_4$ shown in FIG. 7, that is, becomes a state shown in FIG. 12. In the state shown in FIG. 12, the second step detection sensor 36B is turned on, and dregs 7 are left on the paper filter 21.

The controller 7, when the second step detection sensor 36B is in the on state, performs the step of disposal of dregs based on "off" of the first and third step detection sensors 36A, 36C. Specifically, the controller 7 drives the disposal motor 40 in a forward direction. The drive torque of the disposal motor 40 is transmitted through the reduction gear 41 to the output shaft 41a that is then rotated in a forward direction to rotate the filter delivery roller 44, whereby the paper filter 21 is drawn out. When the dregs 7 on the paper filter 21 pass through the roller 22B, as indicated by an imaginary line of FIG. 13(a), the dregs 7 are broken, separated from the paper filter 21, and dropped into a waste bucket (not shown). The waste pipe opening detection sensor 43A is subjected to light shielding by the waste pipe opening detection plate 42A and outputs an off signal to the controller 7. The controller 7 stops the drive of the disposal motor 40 based on the off signal from the waste pipe opening detection sensor 43A. The principal part of the extractor 1 becomes a state shown in FIG. 13.

In the drawing of the paper filter 21, when there is still paper filter 21 left, the remaining filter detection lever 93 takes a position shown in FIG. 2 due to the tension of the drawn paper filter 21. As a result, the remaining filter detection sensor 95 is subjected to light shielding by the encoder 94.

On the other hand, in the drawing of the paper filter 21, when there is no paper filter 21 left, the following operation is carried out.

(4.1) Where the final end of the paper filter 21 is in the state of fixation to roll core 61 (see FIG. 14)

When the paper filter 21 has been drawn out by the filter delivery roller 44, the tension of the drawn paper filter 21 is increased. This causes the front end of the remaining filter detection lever 93 put on the filter paper 21 to be rotated clockwise, which permits the encoder 94 to be also rotated clockwise. As a result, the remaining filter detection sensor 95 is turned on due to elimination of the light shielding by the encoder 94, and outputs a filter exhaustion signal to the controller 7. The controller 7, upon receipt of the filter exhaustion signal from the remaining filter detection sensor 95, turns on the filter alarm lamp 66, indicating that the paper filter 21 has been used up.

(4.2) Where the final end of the paper filter 21 is not in the state of fixation to roll core 91 (see FIG. 15)

When the paper filter 21 has been drawn out by the filter delivery roller 44, the tension of the drawn paper filter 21 becomes zero. As a result, the force in the clockwise direction is no longer applied to the remaining filter detection lever 93. For this reason, the remaining filter detection lever 93 is rotated counterclockwise, and this permits the encoder 94 to be rotated counterclockwise. As a result, the remaining filter detection sensor 95 is turned on due to elimination of the light shielding by the encoder 94 and outputs a filter exhaustion signal to the controller 7. The controller 7, upon receipt of the filter exhaustion signal from the remaining filter detection sensor 95, turns on the filter alarm lamp 66, indicating that the paper filter 21 has been used up.

(5) Operation of Return to Stand-by State

Upon the completion of the step of disposal of dregs, the controller 7 drives the extraction motor 24 and the disposal motor 40 in a forward direction. The principal part of the extractor 1 is returned to the stand-by state shown in FIG. 8. Thereafter, each time when the selling signal is input into the controller 7, the operation of steps (1) to (5) is repeated.

According to the above preferred embodiment, whether or not there is still paper filter 21 left is detected based on a change in tension of the paper filter drawn out from the roll core 91. Therefore, independently of whether or not the final end of the paper filter 21 is in the state of fixation to the roll core 91, the exhaustion of the paper filter 21 can be detected without leaving the residue of the paper filter. This eliminates the limitation in the type of the paper filter 21 used and, at the same time, enables the paper filter 21 to be used without waste of the paper filter. In the above preferred embodiment, a photosensor has been used as means for outputting the filter exhaustion signal. Microswitches and other sensors may be used instead of the photosensor.

Figure 16:
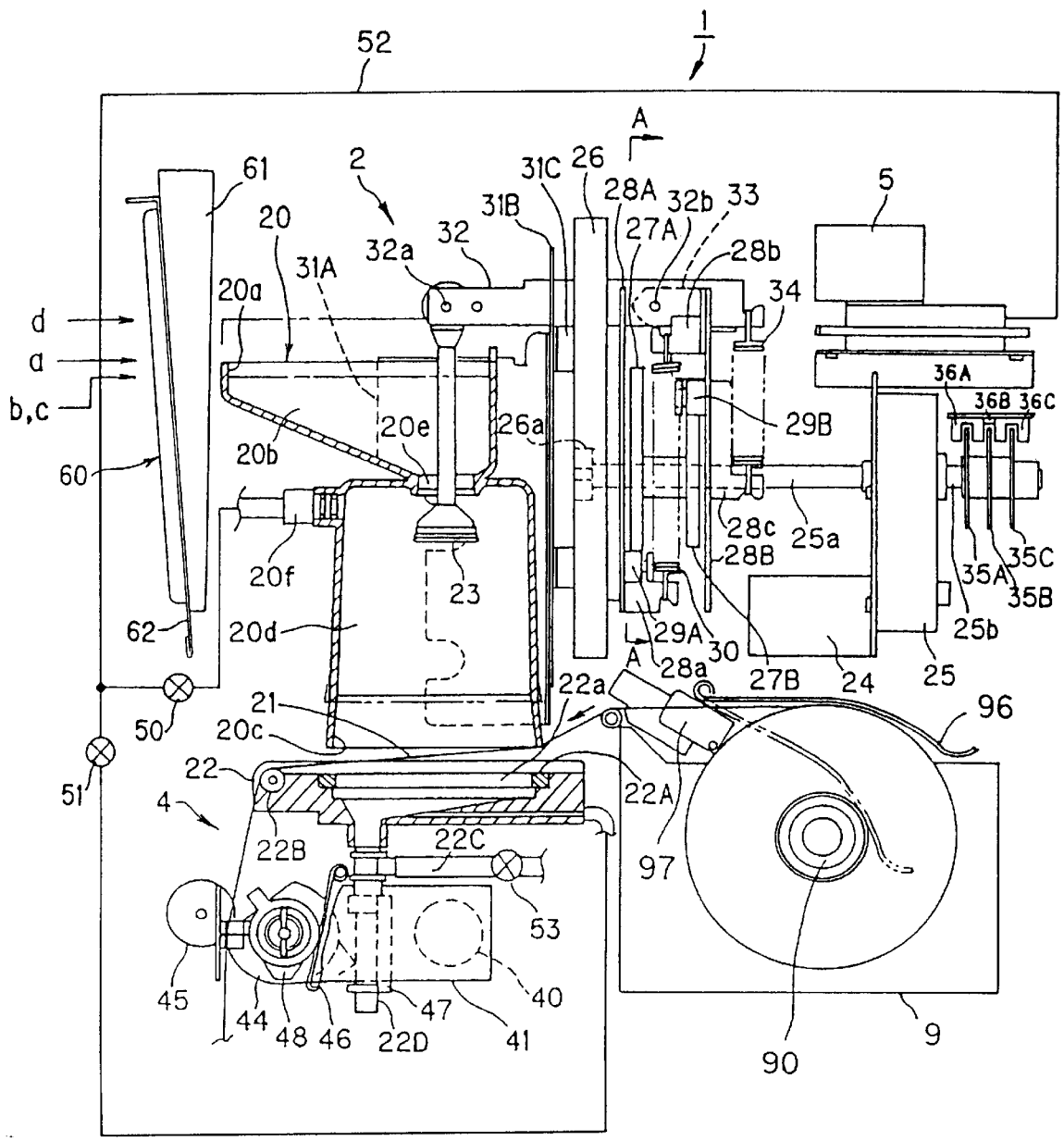
FIG. 16 is an explanatory view of a beverage extractor according to the second preferred embodiment of the invention.

FIG. 16 shows a beverage extractor according to the second preferred embodiment of the invention. This beverage extractor 1 is the same as the beverage extractor shown in FIG. 2, except that different means is used for detecting the exhaustion of the paper filter in the paper filter feeder 9 and, in addition, a paper filter pushing mechanism 60 is additionally provided.

Therefore, the beverage extractor in its portions different from the beverage extractor shown in FIG. 2 will be mainly explained for avoiding the repetition of the explanation. For the same portions, reference will be made to the drawings which have been already explained according to need.

The paper filter 21 is constructed so that it is set as a roll around a rotatable shaft 90 and drawn out in the left direction in FIG. 16 by the drive of the disposal motor 40. The detection of the exhaustion of the paper filter 21 is carried out by the filter detection lever 96 with a rotatably supported base end, the middle portion or the front end side thereof being always abutted against the rolled paper filter 21, and a remaining filter detection sensor 97, such as a microswitch, which, when the filter detection lever 96 is rotated as a result of a small residue of the paper filter 21 to perform switching operation, outputs a detection signal indicating the exhaustion of the paper filter 21 to the controller 7 described below to output an alarm or the like.

Figure 17:
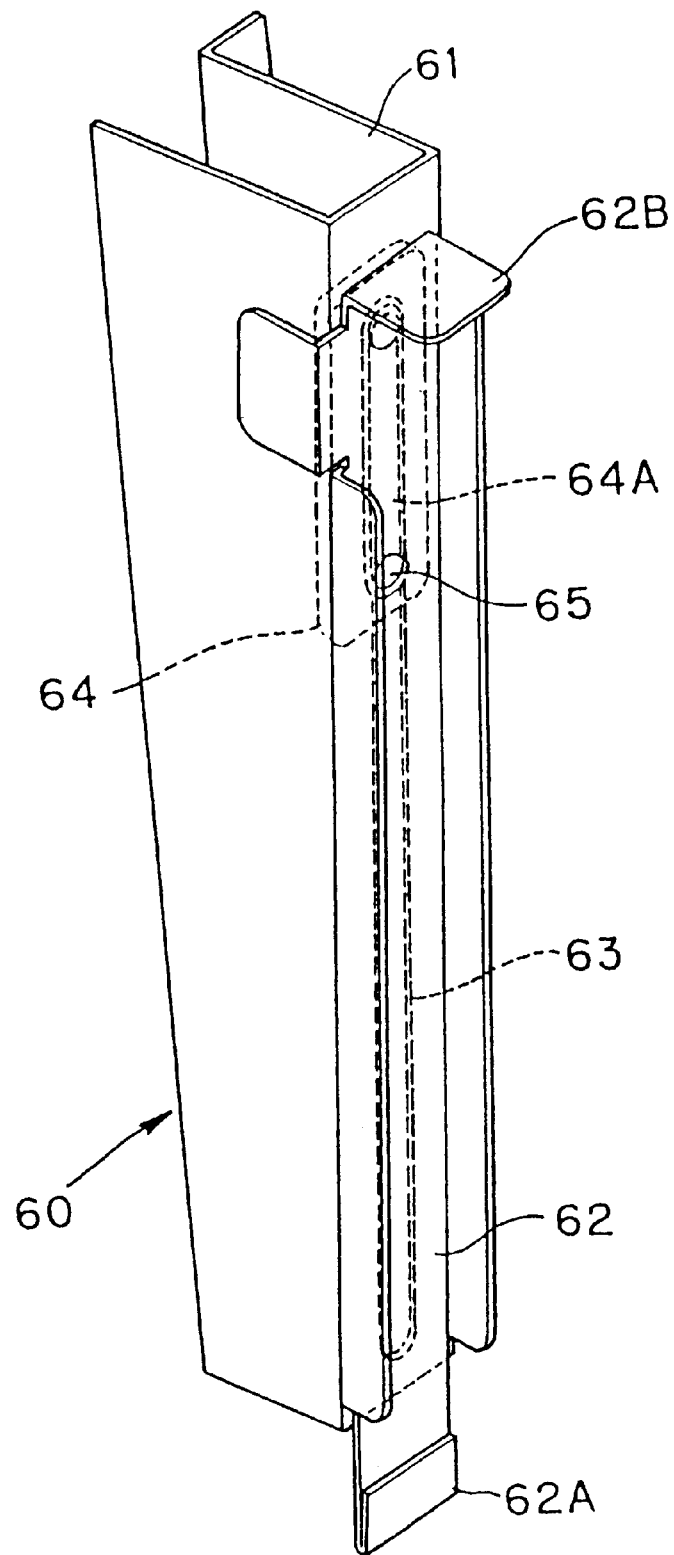
FIG. 17 is a perspective view of a paper filter pushing mechanism according to the second preferred embodiment of the invention.

FIG. 17 shows a paper filter pushing mechanism 60. The paper filter pushing mechanism 60 comprises: a slider 64 that permits the protrusion 64A to be engaged with a groove 63 provided on a receiving base 61 and to be slid; and a fixing pin 65 that fixes the protrusion 64A of the slider 64 and the pushing lever 62 and puts the pushing lever 62 and the slider 64 under a predetermined pressure in the receiving base 61 so that the pushing lever 62 does not drop by gravitation. The pushing lever 62 has a folded portion 62A in its lower end and a handle 62b in its upper end and constructed so that downward depression of the handle 62B permits the folded portion 62A to be positioned between guide rollers 45 shown in FIG. 5 and FIG. 16. That is, at the time of replacement of the paper filter 21, a newly set paper filter is guided between the filter delivery roller 44 and the guide roller 45.

Figure 18:
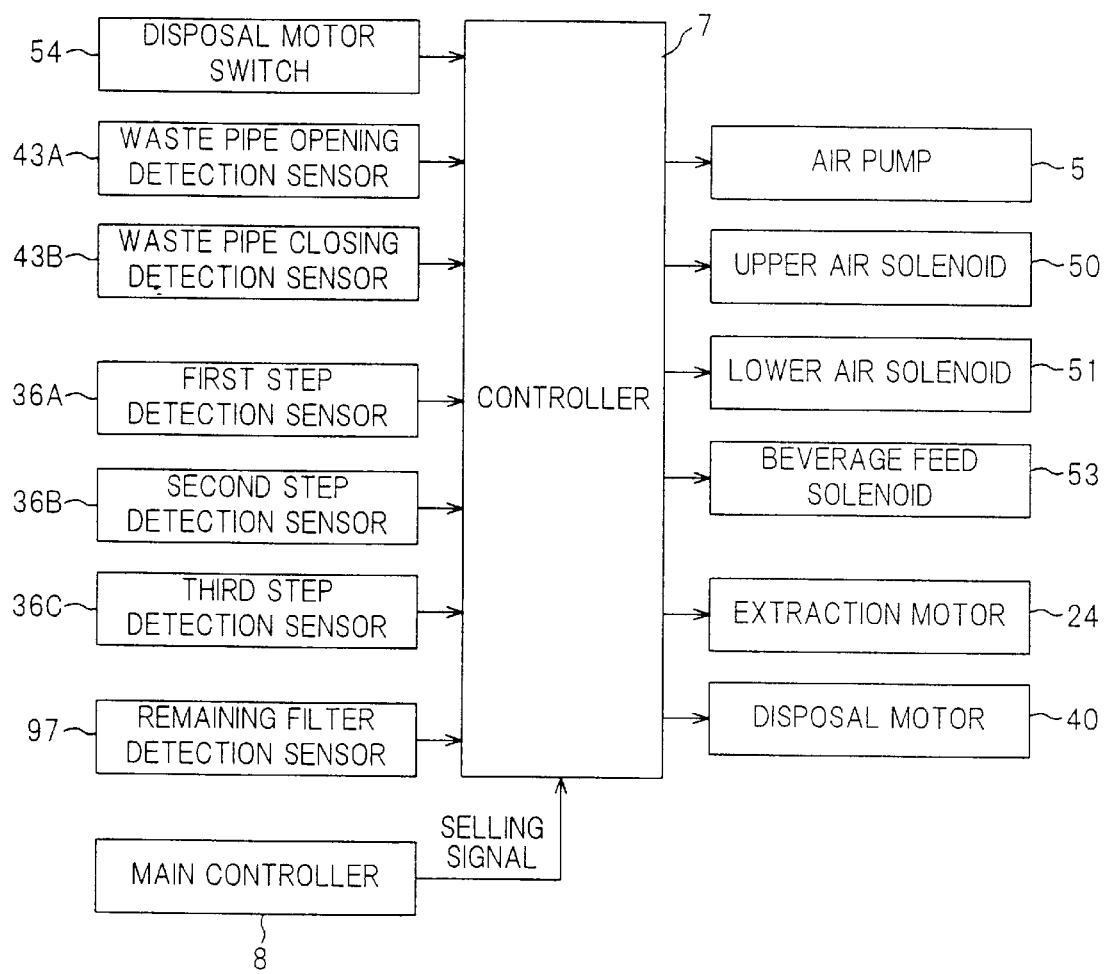
FIG. 18 is a block diagram showing a control system according to the second preferred embodiment of the invention.

FIG. 18 is a control system for the beverage extractor 1. This beverage extractor 1 comprises a controller 7 for controlling each section of the extractor 1. To the controller 7 are connected the disposal motor switch 54, the waste pipe opening detection sensor 43A and the waste pipe closing detection sensor 43B shown in FIG. 5, the first, second, and third step detection sensors 36A, 36B, and 36C, the remaining filter detection sensor 97, the air pump 5, the upper air solenoid 50, the lower air solenoid 51, the beverage feed solenoid 53, the extractor motor 24, and the disposal motor 40. Further, the main controller 8 responsible for control of selling of the extracted beverage is also connected to the controller 7. A disposal motor switch 54 functions to forcibly drive the disposal motor 40. Specifically, at the time of replacement of the paper filter 21, the disposal motor switch 54, when a newly set paper filter has been guided by means of a pushing lever 62 into between the filter delivery roller 44 and the guide roller 45, functions to nip the new paper filter between the filter delivery roller 44 and the guide roller 45.

For each selling of the extracted beverage, the main controller 8 outputs a selling signal to the controller 7, and controller 7, upon receipt of the selling signal from the main controller 8, controls the extraction motor 24, the disposal motor 40, and the air pump 5 to perform a series of steps as shown in FIGS. 8 to FIGS. 13, that is, the step of agitation, the step of extraction, and the step of disposal of dregs.

In the above construction, as soon as the paper filter 21 has been used up and a detection signal is output from the remaining filter detection sensor 97, the controller 7 performs output of an alarm or the like to urge the replacement of the paper filter 21.

Upon output of an alarm or the like, a person responsible for the replacement performs the replacement of the paper filter 21 as follows.

Figure 19:
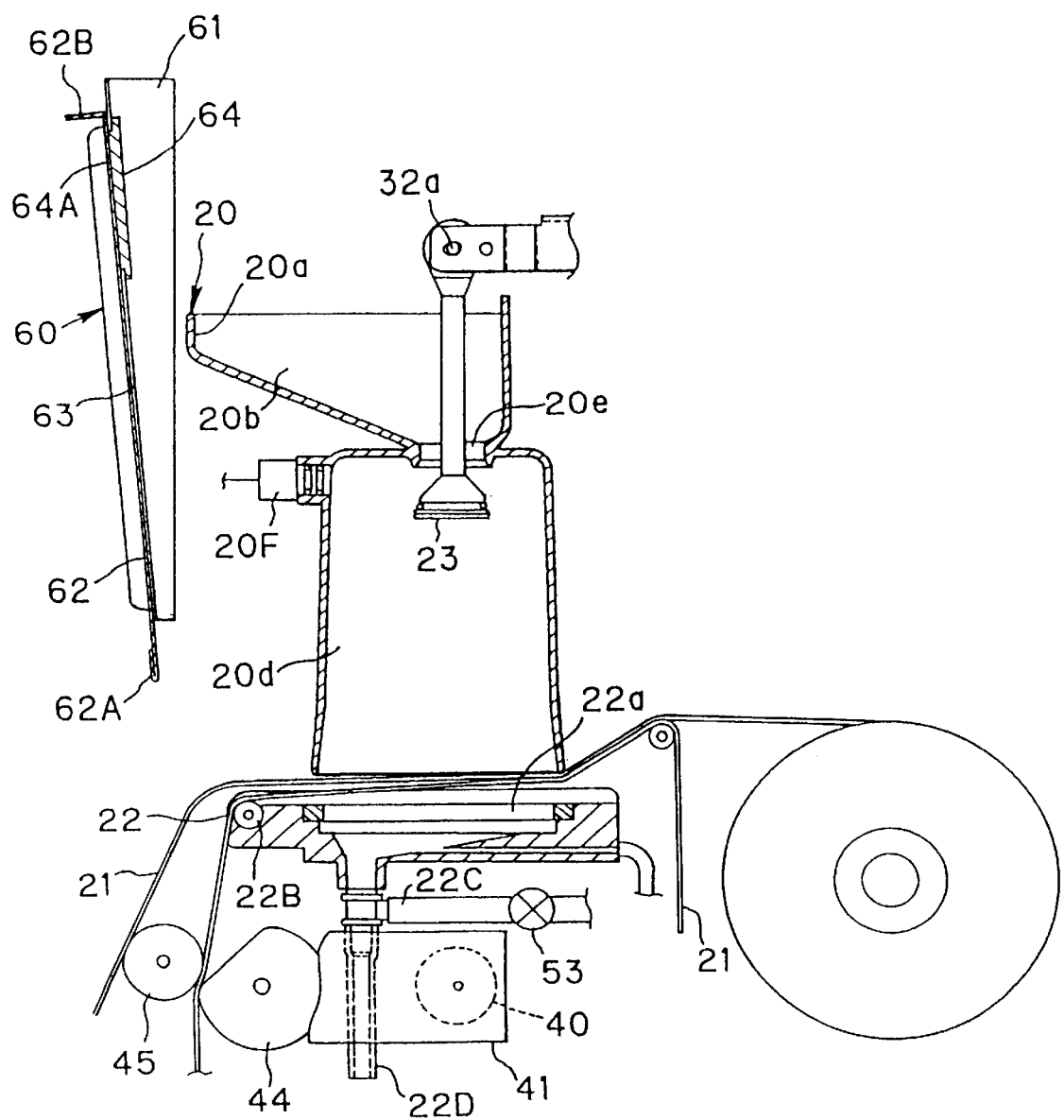
FIG. 19 is a diagram illustrating the replacement of a paper filter according to the second preferred embodiment of the invention.
Figure 20:
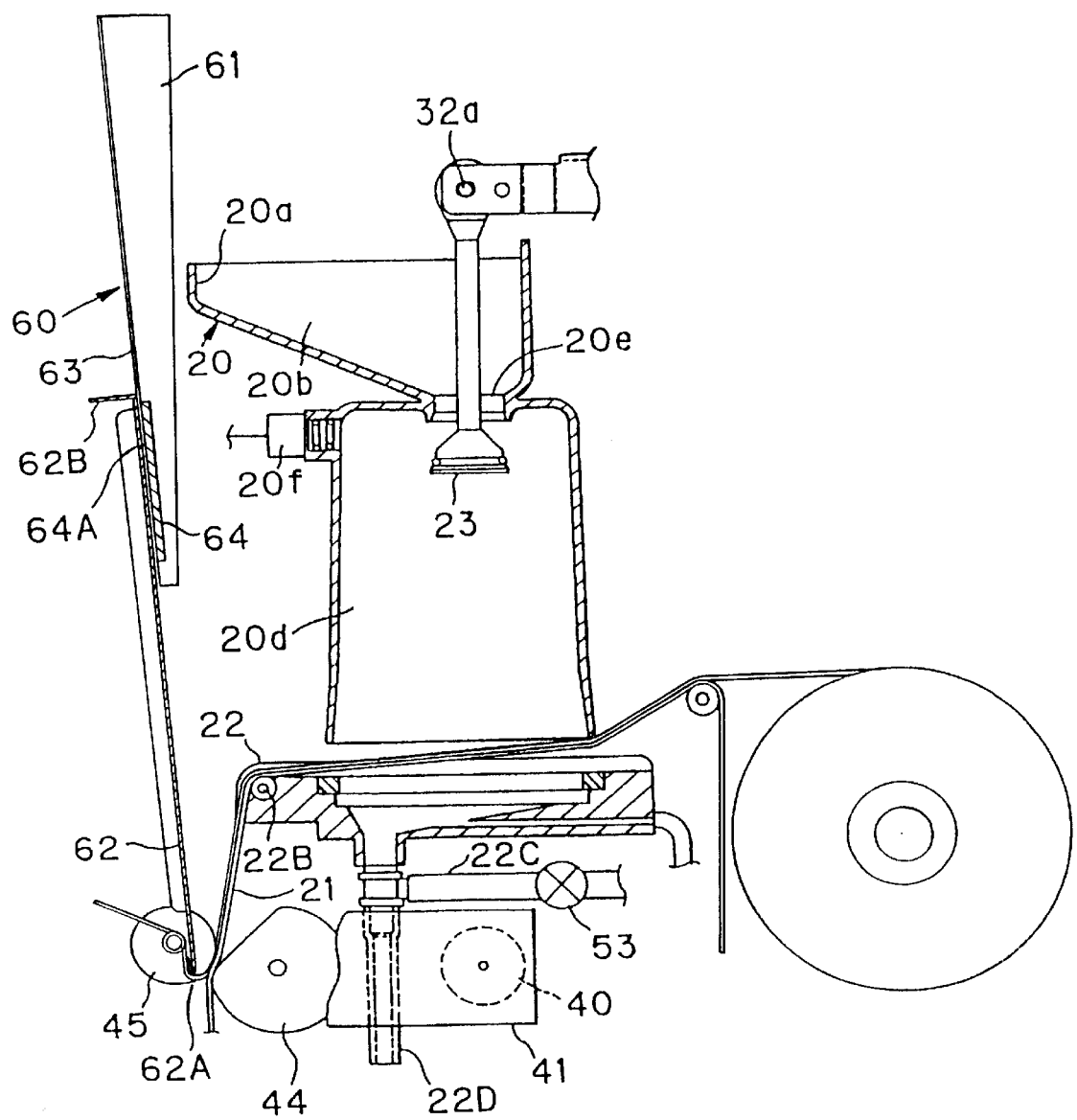
FIG. 20 is a diagram illustrating the replacement of a paper filter according to the second preferred embodiment of the invention.

At the output, as shown in FIG. 19, a new paper filter 21 is set on the exhausted paper filter 21. As shown in FIG. 20, the pushing lever 62 is slid downward by utilizing the handle 62B of the pushing lever 62. As soon as the pushing lever 62 is slid downward and the folded portion 62A of the pushing lever 62 reaches between a pair of guide rollers 45, the newly set paper filter 21 is guided between the filter delivery roller 44 and the guide roller 45. At that time, the person for the replacement of the paper filter turns on the disposal motor switch 54 to drive the filter delivery roller 44. This permits the newly set paper filter 21 to be nipped between the filter delivery roller 44 and the guide roller 45 and, at the same time, permits the used paper filter 21 to be delivered from between the filter delivery roller 44 and the guide roller 45. In this case, the folded portion 62A of the pushing lever 62 is positioned between the pair of guide rollers 45 and hence poses no trouble in the drive of the filter delivery roller 44. Upon the completion of the replacement of the paper filter 21, the pushing lever 62 is slid upward and returned to the original position.

According to the above preferred embodiment, in replacing the paper filter 21 with a new one, the paper filter 21 to be newly set is guided to the nip between the filter delivery roller 44 and the guide roller 45 by means of the paper filter pushing mechanism 60. In this case, the filter delivery roller 44 is driven to nip the new paper filter 21 between the filter delivery roller 44 and the guide roller 45. This eliminates the need to bring hands into contact with guide rollers and the shaft for the guide rollers on which dregs are deposited. Therefore, the paper filter 21 can be exchanged without soiling of hands. Further, since work can be performed simply by vertically sliding the pushing lever 62 of the paper filter pushing mechanism 60, the paper filter can be easily replaced even in a narrow work space.

Figure 21:
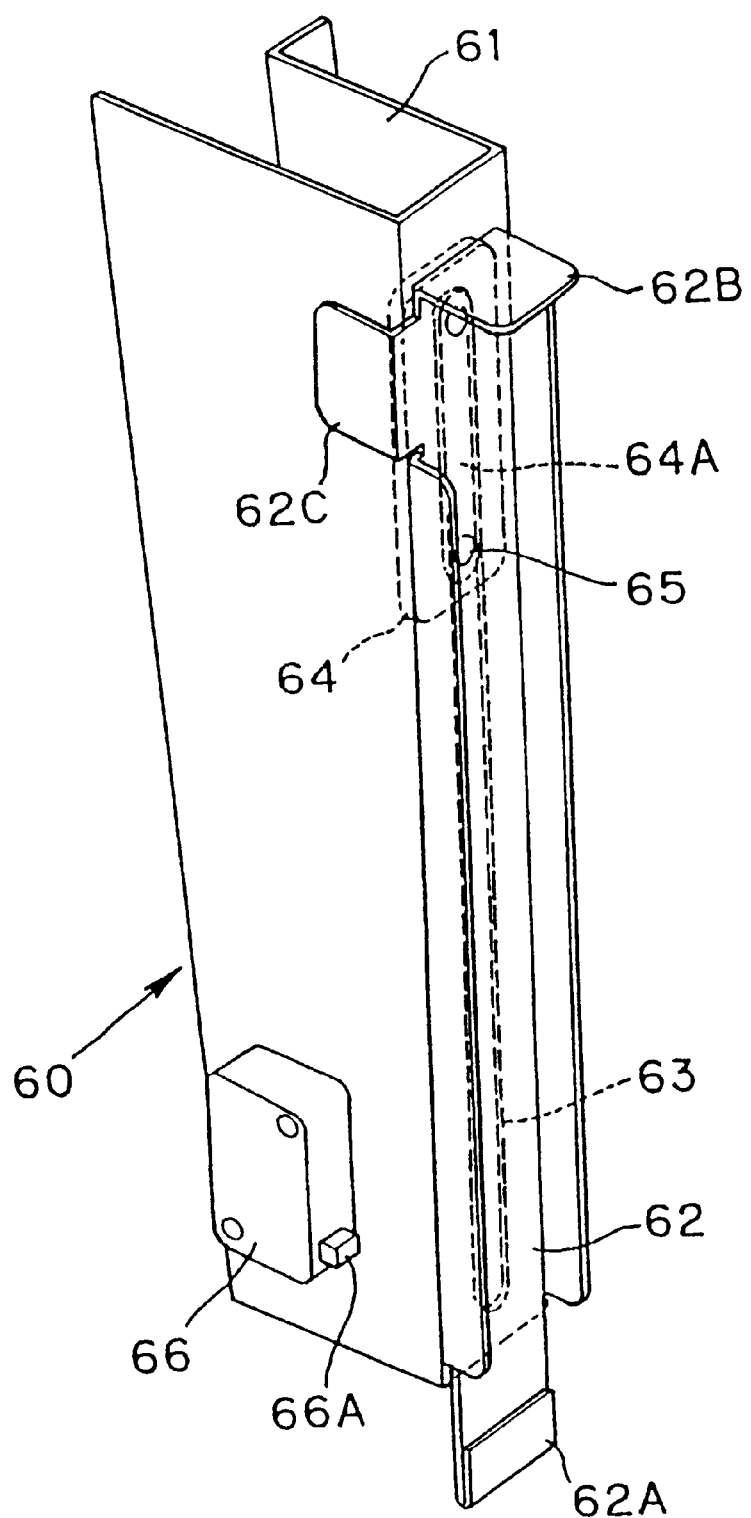
FIG. 21 is a perspective view of a paper filter pushing mechanism according to the third preferred embodiment of the invention.

FIG. 21 shows a paper filter pushing mechanism 60 according to the third preferred embodiment of the invention. According to this paper filter pushing mechanism 60, a microswitch 66 is provided on the outside of the receiving base 61. The microswitch 66 is turned on when the pushing lever 62 is slid to the lowermost position to permit a contactor 62C to press an actuator 66A. The microswitch 66 is an alternative to the disposal motor switch in the first preferred embodiment of the invention. As soon as the microswitch 66 is turned on, the disposal motor 40 is driven.

In the above construction, when the pushing lever 62 is slid to the lowermost position to permit a newly set paper filter 21 to be guided between the filter delivery roller 44 and the guide roller 45, the contactor 62C of the pushing lever 62 presses the actuator 66A of the microswitch 66 to turn on the actuator 66A. This permits the disposal motor 40 to be automatically driven, so that the filter delivery roller 44 is rotated to nip the newly set paper filter 21 between the filter delivery roller 44 and the guide roller 45.

According to this preferred embodiment, there is no need for a person responsible for the replacement of the paper filter to depress the switch of the disposal motor 40. Therefore, the replacement can be carried out more easily than that in the first preferred embodiment.

Figure 22:
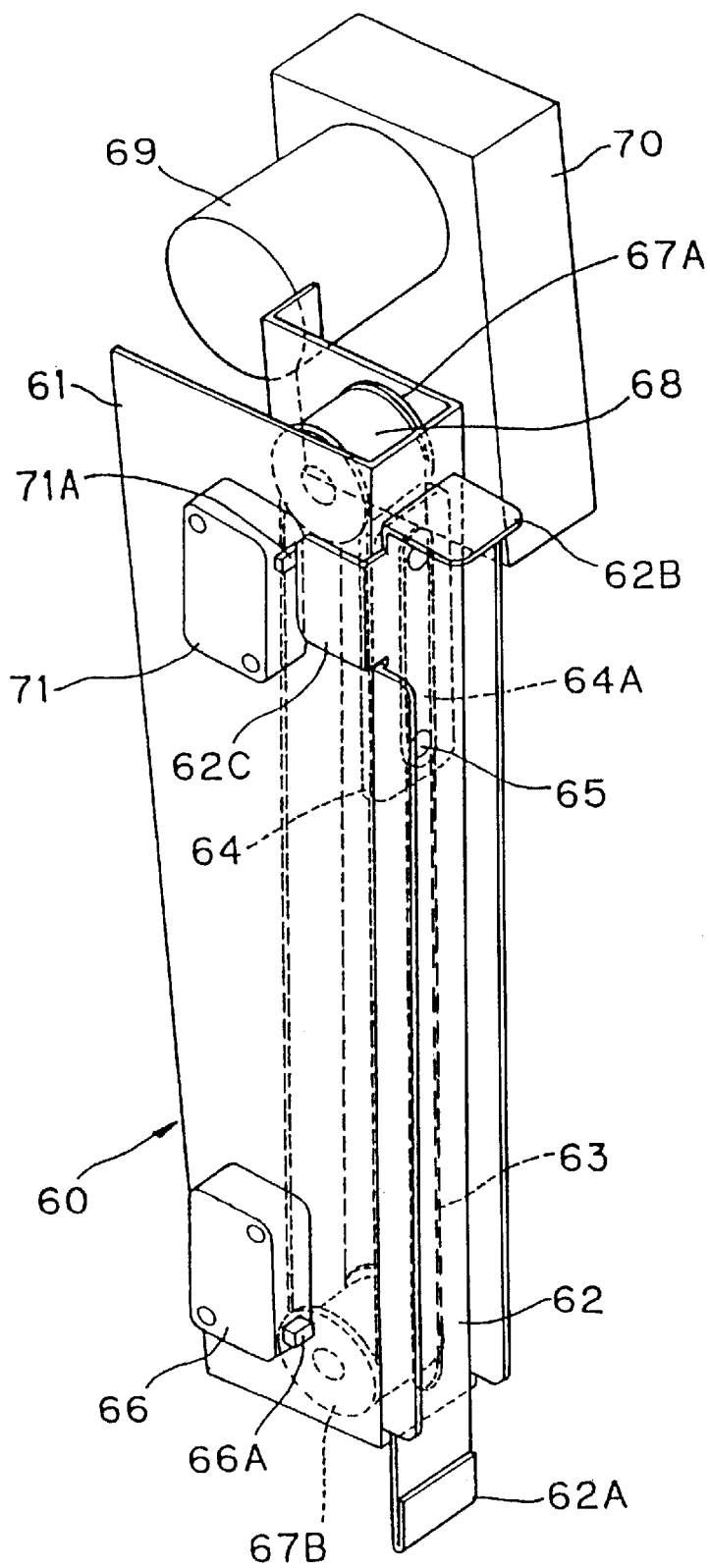
FIG. 22 is a perspective view of a paper filter pushing mechanism according to the fourth preferred embodiment of the invention.
Figure 23:
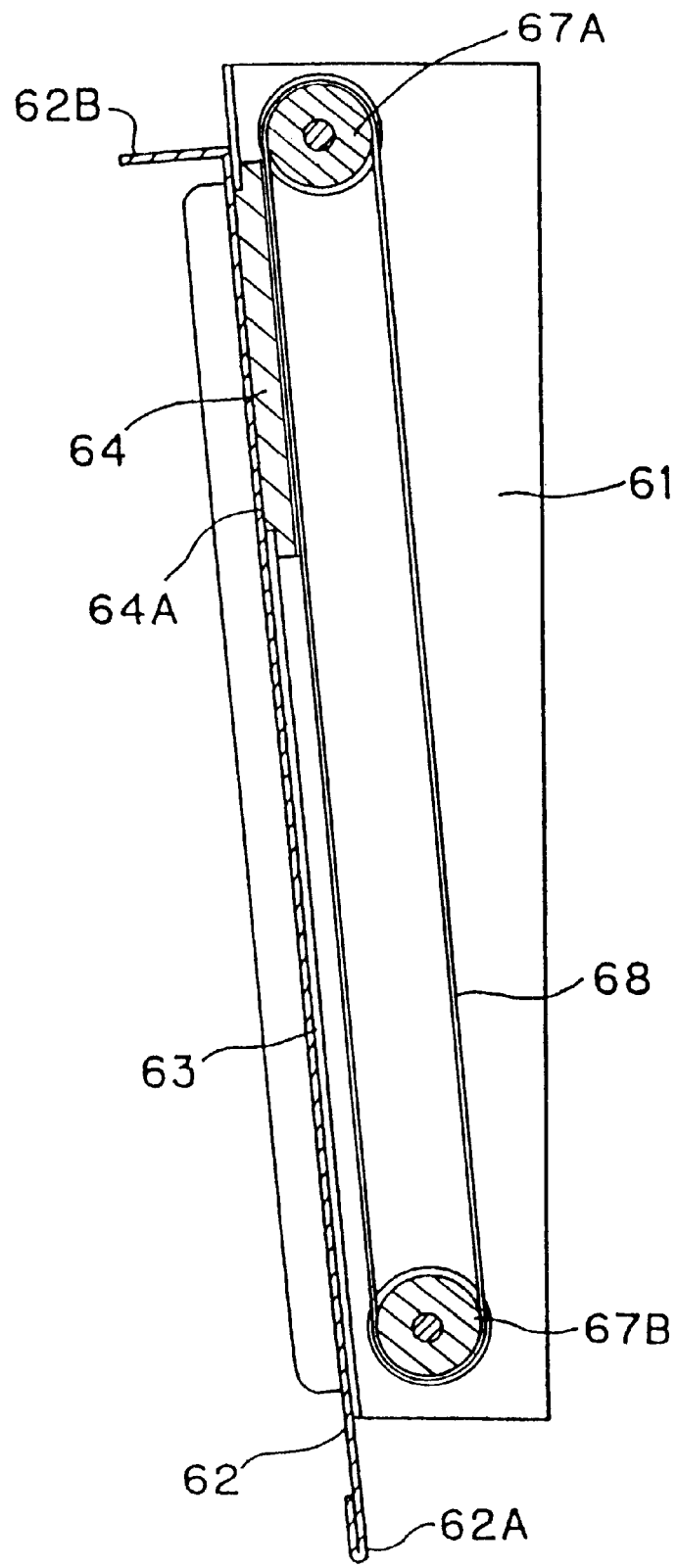
FIG. 23 is a sectional side elevation of a paper filter pushing mechanism according to the fourth preferred embodiment of the invention.

FIGS. 22 and 23 show a paper filter pushing mechanism 60 according to the fourth preferred embodiment of the invention, wherein FIG. 22 is a perspective view and FIG. 23 a side sectional elevation. This paper filter pushing mechanism 60 comprises: a belt 68 applied on the pair of pulleys disposed respectively on the upper and lower parts within the receiving base 61; and a slider 64 fixed thereto. One (67A) of the pulleys 67A, 67B is connected to the output shaft of the pushing motor 69 through the reduction gear 70. Microswitches 71, 66 are provided on the outside of the receiving base 61. The microswitches are turned on when the pushing lever 62 is slid to the uppermost or lowermost position to permit a contactor 62C of the pushing lever 62 to press an actuator 71A or 66A.

In the above construction, when a pushing start switch (not shown) is turned on, the controller 7 drives the pushing motor 69 to slide the pushing lever 62 downward. When the pushing lever 62 is slid to the lowermost point and the newly set paper filter 21 is guided between the filter delivery roller 44 and the guide roller 45, the contactor 62C of the pushing lever 62 presses and turns on the actuator 66A of the microswitch 66. This stops the drive of the pushing motor 69, drives the disposal motor 40, and rotates the filter delivery motor 44, permitting the newly set paper filter to be nipped between the filter delivery roller 44 and the guide roller 45. When the disposal motor 40 is rotated by a predetermined number of revolutions, the controller 6 stops the drive of the disposal motor 40 and, in addition, drives the pushing motor 69 in a direction opposite to the direction at the time of pushing to slide the pushing lever 62 upward. When the pushing lever 62 is slid to the uppermost position, the contactor 62C of the pushing lever 62 presses and turns on the actuator 71A of the microswitch 71. This stops the drive of the pushing motor 69.

According to this preferred embodiment, when a pushing start switch (not shown) is turned on, all of the elevation of the pushing lever and the rotation of the filter delivery roller are automatically carried out. Therefore, the replacement can be carried out more easily than that in the first and second preferred embodiments.

As described above, according to the paper filter feeder for beverage extractors of the invention, the tension of a paper filter fed from feed means is detected, and whether or not there is still paper filter left is detected based on the results of the detection. Therefore, the exhaustion of the paper filter can be accurately detected without limitation in the type of paper filters used.

Further, according to the paper filter feeder for beverage extractors of the invention, a paper filter to be newly set is guided by guide means into nip between a delivery roller and a guide roller. In this case, the delivery roller is driven to nip the new paper filter between the delivery roller and the guide roller. This enables the paper filter to be replaced without soiling hands of a person who replaces the paper filter. Further, the paper filter can be easily replaced even in a narrow work space.

The invention has been described in detail with particular reference to preferred embodiments, but it will be understood that variations and modifications can be effected within the scope of the invention as set forth in the appended claims.

What is claimed is:

1. A paper filter feeder for a beverage extractor that feeds a paper filter, for extraction, into an extraction chamber where a beverage material is mixed with hot water to extract a beverage, said paper filter feeder comprising:

feed means for feeding the paper filter into the extraction chamber;

tension detection means for detecting the tension of the paper filter fed from the feed means; and remainder detection means for detecting, based on the tension, whether or not there is still paper filter remaining unused.

2. The paper filter feeder according to claim 1, wherein the feed means is a roll core around which the paper filter is wound with the final end of the paper filter fixed on the core, the tension detection means is a lever comprising a free end mounted on the filter paper rewound from the roll core and a hinged end which, upon an increase in tension of the paper filter as a result of exhaustion of the paper filter, is rotated in a first direction due to the displacement of the free end, and the remainder detection means is a sensor for detecting the rotation of the hinged end.

3. The paper filter feeder according to claim 1, wherein the feed means is a roll core around which the paper filter is wound with the final end of the paper filter not fixed on the core, the tension detection means is a lever comprising a free end mounted on the filter paper rewound from the roll core and a hinged end which, upon a reduction in tension of the paper filter as a result of exhaustion of the paper filter, is rotated in a second direction due to the displacement of the free end, and the remainder detection means is a sensor for detecting the rotation of the hinged end.

4. The paper filter feeder according to claim 2, wherein the sensor is a photosensor.

5. The paper filter feeder according to claim 3, wherein the sensor is a photosensor.

* * * * *